US011877011B2

(12) United States Patent
Wang

(10) Patent No.: US 11,877,011 B2
(45) Date of Patent: Jan. 16, 2024

(54) PICTURE DIMENSION INDICATION IN DECODER CONFIGURATION RECORD

(71) Applicant: Lemon Inc., Grand Cayman (KY)

(72) Inventor: Ye-Kui Wang, San Diego, CA (US)

(73) Assignee: Lemon Inc., Grand Cayman (KY)

( * ) Notice: Subject to any disclaimer, the term of this patent is extended or adjusted under 35 U.S.C. 154(b) by 94 days.

(21) Appl. No.: 17/477,284

(22) Filed: Sep. 16, 2021

(65) Prior Publication Data
US 2022/0086498 A1 Mar. 17, 2022

Related U.S. Application Data

(60) Provisional application No. 63/079,910, filed on Sep. 17, 2020.

(51) Int. Cl.
*H04N 19/70* (2014.01)
*H04N 19/132* (2014.01)
(Continued)

(52) U.S. Cl.
CPC ........... *H04N 19/70* (2014.11); *H04N 19/105* (2014.11); *H04N 19/132* (2014.11);
(Continued)

(58) Field of Classification Search
CPC .... H04N 19/70; H04N 19/132; H04N 19/172; H04N 19/184; H04N 19/188
See application file for complete search history.

(56) References Cited

U.S. PATENT DOCUMENTS 9,479,776 B2 * 10/2016 Wang .............. H04N 19/50
9,532,046 B2 * 12/2016 Ramasubramonian ............
H04N 19/50
(Continued)

FOREIGN PATENT DOCUMENTS

CN 104813671 A 7/2015
CN 105027567 A 11/2015
(Continued)

OTHER PUBLICATIONS

"Versatile Video Coding," Series H: Audiovisual and Multimedia Systems: Infrastructure of Audiovisual Services—Coding of Moving Video, ITU-T Telecommunication Standardization Sector of ITU, H.266, Aug. 2020.
(Continued)

*Primary Examiner* — Fabio S Lima
(74) *Attorney, Agent, or Firm* — Perkins Coie LLP

(57) ABSTRACT

Systems, methods and apparatus for processing visual media data are described. One example method includes performing a conversion between visual media data and a visual media file that includes one or more tracks that store one or more bitstreams of the visual media data according to a format rule; wherein the format rule specifies whether to include, in a configuration record of a track, a first element indicative of a picture width of the track and/or a second element indicative of a picture height of the track is based on (1) whether a third element indicative of whether the track contains a specific bitstream corresponding to a specific output layer set and/or (2) whether the configuration record is for a single-layer bitstream, and wherein the format rule further specifies that the first element and/or the second element, when included in the configuration record of the track, are represented in a field including 16 bits.

20 Claims, 10 Drawing Sheets

(51) Int. Cl.

| H04N 19/172 | (2014.01) |
| --- | --- |
| H04N 19/184 | (2014.01) |
| H04N 19/169 | (2014.01) |
| H04N 19/105 | (2014.01) |
| H04N 19/186 | (2014.01) |

(52) U.S. Cl.
CPC ......... *H04N 19/172* (2014.11); *H04N 19/184* (2014.11); *H04N 19/186* (2014.11); *H04N 19/188* (2014.11)

(56) References Cited

U.S. PATENT DOCUMENTS

| 10,271,064 | B2* | 4/2019 | Chien | H04N 19/61 |
| --- | --- | --- | --- | --- |
| 2013/0195205 | A1* | 8/2013 | Wang | H04N 19/46 375/240.26 |
| 2014/0192153 | A1 | 7/2014 | Wang et al. | |
| 2015/0016545 | A1 | 1/2015 | Ramasubramonian et al. | |
| 2015/0110473 | A1* | 4/2015 | Wang | H04N 19/573 386/341 |
| 2015/0358640 | A1* | 12/2015 | Hendry | H04N 19/61 375/240.13 |
| 2015/0373343 | A1* | 12/2015 | Hendry | H04N 19/70 375/240.12 |
| 2015/0373373 | A1* | 12/2015 | Wang | H04N 19/105 375/240.26 |
| 2016/0156915 | A1* | 6/2016 | Choi | H04N 19/136 375/240.08 |
| 2016/0234516 | A1 | 8/2016 | Hendry et al. | |
| 2016/0373771 | A1* | 12/2016 | Hendry | H04N 19/70 |
| 2017/0127073 | A1 | 5/2017 | Hirabayashi et al. | |
| 2017/0272782 | A1* | 9/2017 | Li | H04N 19/96 |
| 2019/0320172 | A1* | 10/2019 | Zhang | H04N 19/189 |
| 2020/0021853 | A1 | 1/2020 | Deshpande | |
| 2022/0086498 | A1* | 3/2022 | Wang | H04N 19/188 |
| 2022/0086499 | A1* | 3/2022 | Wang | H04N 21/234327 |
| 2022/0103865 | A1 | 3/2022 | Wang | |
| 2023/0015840 | A1* | 1/2023 | Sánchez de la Fuente | H04N 19/31 |
| 2023/0025332 | A1* | 1/2023 | Denoual | H04N 21/84 |
| 2023/0028609 | A1* | 1/2023 | Wang | H04N 19/172 |

FOREIGN PATENT DOCUMENTS

| CN | 107750461 | A | 3/2018 |
| --- | --- | --- | --- |
| JP | 2015506650 | A | 3/2015 |
| JP | 2018511208 | A | 4/2018 |
| JP | 2018524891 | A | 8/2018 |
| WO | 2015012227 | A1 | 1/2015 |
| WO | 2015026136 | A1 | 2/2015 |
| WO | 2016002495 | A1 | 1/2016 |
| WO | 2016205747 | A1 | 12/2016 |
| WO | 2017066617 | A1 | 4/2017 |
| WO | 2018173498 | A1 | 9/2018 |
| WO | 2020058567 | A1 | 3/2020 |

OTHER PUBLICATIONS

Non Final Office Action from U.S. Appl. No. 17/476,809 dated Oct. 20, 2022.

Hendry et al. "On HEVC and Layered HEVC File Formats," 111 MPEG Meeting, Feb. 16-20, 2020, Geneva, Motion Picture Expert Group or ISO/IEC JTC1/SC29/WG11, No. m35923, Feb. 2015, retrieved from the internet Feb. 11, 2015.

Thomas et al. "On Carriage of VVC Independent Layers 14496-15," 131 MPEG Meeting, Jun. 29 to Jul. 3, 2020, Motion Picture Expert Group or ISO/IEC JTC1/SC29/WG11, No. m54283, Jun. 30, 2020, retrieved from the internet Jun. 30, 2020.

Extended European Search Report from European Patent Application No. 21197130.4 dated Feb. 11, 2022 (11 pages).

Extended European Search Report from European Patent Application No. 21197131.2 dated Feb. 15, 2022 (11 pages).

Office Action from Indian Patent Application No. 202144041926 dated Mar. 29, 2022 (5 pages).

Office Action from Indian Patent Application No. 202144042163 dated Mar. 30, 2022 (5 pages).

Boyce et al. ""Versatile Supplemental Enhancement Information Messages for Coded Video Bitstreams (Draft 5),"" Joint Video Experts Team (JVET)of ITU-T SG 16 WP 3 and ISO/IEC JTC 1/SC 29/WG 1118th Meeting: by teleconference, Apr. 15-24, 2020, document JVET-S2007, 2020.

Bross et al. ""Versatile Video Coding (Draft 10),"" Joint Video Experts Team (JVET)of ITU-T SG 16 WP 3 and ISO/IEC JTC 1/SC 29/WG 1119th Meeting: by teleconference, Jun. 22-Jul. 1, 2020, document JVET-S2001, 2020.

Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.

"Information Technology—High Efficiency Coding and Media Delivery in Heterogeneous Environments—Part 2: High Efficiency Video Coding" Apr. 20, 2018, ISO/DIS 23008, 4th Edition.

"Information Technology—High Efficiency Coding and Media Delivery in Heterogeneous Environments —Part 12: Image File Format—Amendment 3: Support for VVC, EVC, Slideshows and Other Improvements," ISO/IEC 23008-12:2017(E) Amendment 3, ISO/IEC JTC1/SC 29/WG 11, 2020. N19460.

"Information Technology—Coded Representation of Immersive Media—Part 3: Versatile Video Coding" ISO/IEC JTC 1/SC 29 /WG 11 N 18692, Text of ISO/IEC CD 23090-3, ISO/IEC JTC 1/SC 29/WG 11, Jul. 12, 2019.

"Information Technology—Coding of Audio-Visual Objects—Part 15: Carriage of Network Abstraction Layer (NAL) Unit Structured Video in the ISO Base Media File Format—Amendment 2: Carriage of VVC and EVC in ISOBMFF" ISO/IEC 14496-15:2019(E) Amendment 2, ISO/IEC JTC 1/SC 29/WG 11, 2020, N19454.

"Versatile Supplemental Enhancement Information Messages for Coded Video Bitstreams," Series H: Audiovisual and Multimedia Systems: Infrastructure of Audiovisual Services—Coding of Moving Video, ITU-T Telecommunication Standardization Sector of ITU, H.274, Aug. 2020.

Notice of Allowance from U.S. Appl. No. 17/476,809 dated Feb. 21, 2023.

"Study on One Cross-Layer Optimization Technology for Video Service," Telecommunications Network Technology, Developing Strategy, 2011, pp. 45-50. (cited in CN202111090741.X NOA mailed Sep. 6, 2023).

Wang et al. "Study on the New Technologies of H.264 /AVC Video Coding," H.264 / AVC, The Fourth Research of Institute of Telecommunication Science and Technology, 2005, pp. 55-58. (cited in CN202111090741.X NOA mailed Sep. 6, 2023).

Notice of Allowance from U.S. Appl. No. 17/477,320 dated Jul. 17, 2023.

\* cited by examiner

PICTURE DIMENSION INDICATION IN DECODER CONFIGURATION RECORD

CROSS REFERENCE TO RELATED APPLICATIONS

Under the applicable patent law and/or rules pursuant to the Paris Convention, this application is made to timely claims the priority to and benefits of U.S. Provisional Patent Application No. 63/079,910, filed on Sep. 17, 2020. For all purposes under the law, the entire disclosure of the aforementioned application is incorporated by reference as part of the disclosure of this application.

TECHNICAL FIELD

This patent document relates to generation, storage and consumption of digital audio video media information in a file format.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The present document discloses techniques that can be used by video encoders and decoders for processing coded representation of a video or an image according to a file format.

In one example aspect, a method for processing visual media data is disclosed. The method includes performing a conversion between visual media data and a visual media file including one or more tracks storing one or more bitstreams of the visual media data according to a format rule; wherein the format rule specifies whether a first element indicative of whether a track contains a bitstream corresponding to a specific output layer set controls whether a second element indicative of a chroma format of the track and/or a third element indictive of a bit depth information of the track is included in a configuration record of the track.

In another example aspect, another method for processing visual media data is disclosed. The method includes performing a conversion between visual media data and a visual media file that includes one or more tracks that store one or more bitstreams of the visual media data according to a format rule; wherein the format rule specifies whether to include, in a configuration record of a track, a first element indicative of a picture width of the track and/or a second element indicative of a picture height of the track is based on (1) whether a third element indicative of whether the track contains a specific bitstream corresponding to a specific output layer set and/or (2) whether the configuration record is for a single-layer bitstream, and wherein the format rule further specifies that the first element and/or the second element, when included in the configuration record of the track, are represented in a field including 16 bits.

In another example aspect, another method for processing visual media data is disclosed. The method includes performing a conversion between visual media data and a visual media file that includes one or more tracks that store one or more bitstreams of the visual media data according to a format rule; wherein the visual media file includes an operating point record and an operating point group box, and wherein the format rule specifies to include, for each operating point indicated in the visual media file, in the operating point record and the operating point group box, a first element indicative of a chroma format, a second element indictive of a bit depth information, a third element indicative of a maximum picture width, and/or a fourth element indicative of a maximum picture height.

In yet another example aspect, a video processing apparatus is disclosed. The video processing apparatus comprises a processor configured to implement above-described methods.

In yet another example aspect, a method of storing visual media data to a file including one or more bitstreams is disclosed. The method corresponds to above-described methods and further includes storing the one or more bitstream to a non-transitory computer-readable recording medium.

In yet another example aspect, a computer readable medium that stores a bitstream is disclosed. The bitstream is generated according to above-described methods.

In yet another example aspect, a video processing apparatus for storing a bitstream is disclosed, wherein the video processing apparatus is configured to implement above-described methods.

In yet another example aspect, a computer readable medium on which a bitstream complies to a file format that is generated according to above-described methods is disclosed.

These, and other, features are described throughout the present document.

DETAILED DESCRIPTION

Figure 1:
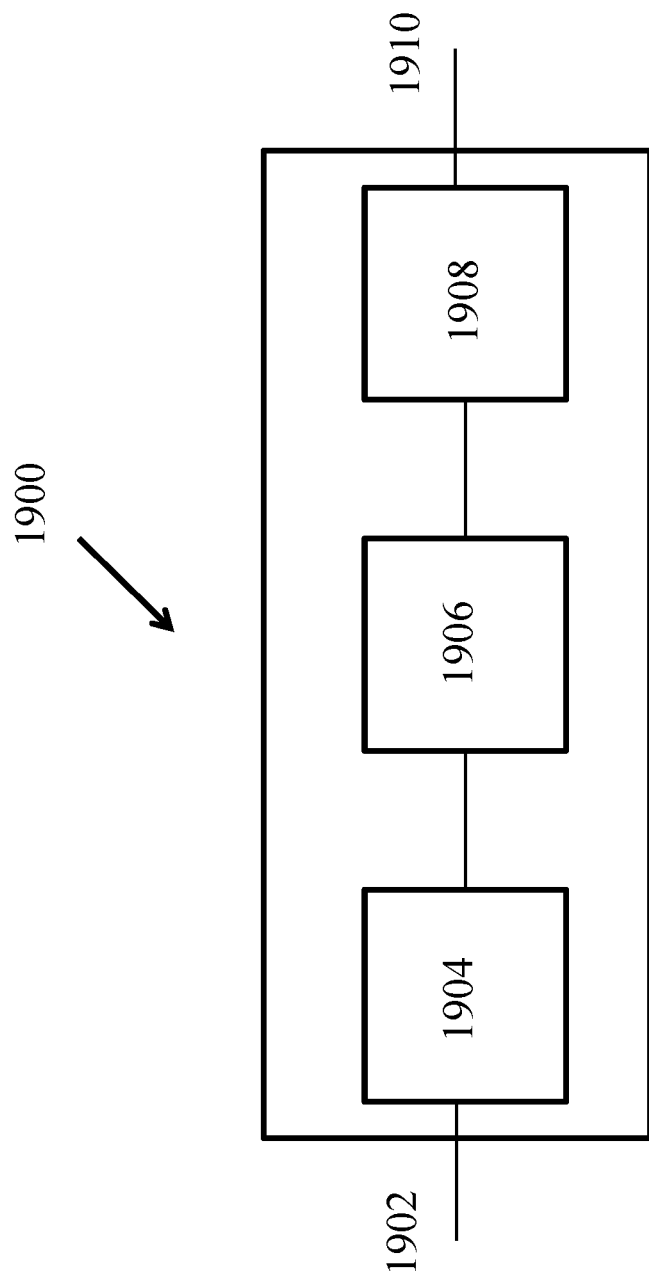
FIG. 1 is a block diagram of an example video processing system.

Section headings are used in the present document for ease of understanding and do not limit the applicability of techniques and embodiments disclosed in each section only to that section. Furthermore, H.266 terminology is used in some description only for ease of understanding and not for limiting scope of the disclosed techniques. As such, the techniques described herein are applicable to other video codec protocols and designs also. In the present document, editing changes are shown to text by strikethrough indicating cancelled text and highlight indicating added text (including boldface italic), with respect to the current draft of the VVC specification or ISOBMFF file format specification.

1. INITIAL DISCUSSION

This document is related to video file format. Specifically, it is related to signalling of picture format information, including chroma format, bit depth, picture width, and picture height, in media files carrying Versatile Video Coding (VVC) video bitstreams based on the ISO base media file format (ISOBMFF). The ideas may be applied individually or in various combination, for video bitstreams coded by any codec, e.g., the VVC standard, and for any video file format, e.g., the VVC video file format being developed.

2. ABBREVIATIONS

ACT adaptive colour transform
ALF adaptive loop filter
AMVR adaptive motion vector resolution
APS adaptation parameter set
AU access unit
AUD access unit delimiter
AVC advanced video coding (Rec. ITU-T H.264|ISO/IEC 14496-10)
B bi-predictive
BCW bi-prediction with CU-level weights
BDOF bi-directional optical flow
BDPCM block-based delta pulse code modulation
BP buffering period
CABAC context-based adaptive binary arithmetic coding
CB coding block
CBR constant bit rate
CCALF cross-component adaptive loop filter
CPB coded picture buffer
CRA clean random access
CRC cyclic redundancy check
CTB coding tree block
CTU coding tree unit
CU coding unit
CVS coded video sequence
DPB decoded picture buffer
DCI decoding capability information
DRAP dependent random access point
DU decoding unit
DUI decoding unit information
EG exponential-Golomb
EGk k-th order exponential-Golomb
EOB end of bitstream
EOS end of sequence
FD filler data
FIFO first-in, first-out
FL fixed-length
GBR green, blue, and red
GCI general constraints information
GDR gradual decoding refresh
GPM geometric partitioning mode
HEVC high efficiency video coding (Rec. ITU-T H.265|ISO/IEC 23008-2)
HRD hypothetical reference decoder
HSS hypothetical stream scheduler
intra
IBC intra block copy
IDR instantaneous decoding refresh
ILRP inter-layer reference picture
IRAP intra random access point
LFNST low frequency non-separable transform
LPS least probable symbol
LSB least significant bit
LTRP long-term reference picture
LMCS luma mapping with chroma scaling
MIP matrix-based intra prediction
MPS most probable symbol
MSB most significant bit
MTS multiple transform selection
MVP motion vector prediction
NAL network abstraction layer
OLS output layer set
OP operation point
OPI operating point information
P predictive
PH picture header
POC picture order count
PPS picture parameter set
PROF prediction refinement with optical flow
PT picture timing
PU picture unit
QP quantization parameter
RADL random access decodable leading (picture)
RASL random access skipped leading (picture)
RBSP raw byte sequence payload
RGB red, green, and blue
RPL reference picture list
SAO sample adaptive offset
SAR sample aspect ratio
SEI supplemental enhancement information
SH slice header
SLI subpicture level information
SODB string of data bits
SPS sequence parameter set
STRP short-term reference picture
STSA step-wise temporal sublayer access
TR truncated rice
VBR variable bit rate
VCL video coding layer
VPS video parameter set
VSEI versatile supplemental enhancement information (Rec. ITU-T H.274|ISO/IEC 23002-7)
VUI video usability information
VVC versatile video coding (Rec. ITU-T H.266|ISO/IEC 23090-3)

3. VIDEO CODING INTRODUCTION 3.1. Video Coding Standards

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, the Joint Video Exploration Team (JVET) was founded by VCEG and MPEG jointly in 2015. Since then, many new methods have been adopted by JVET and put into the reference software named Joint Exploration Model (JEM). The JVET was later renamed to be the Joint Video Experts Team (JVET) when the Versatile Video Coding (VVC) project officially started. VVC [3] is the new coding standard, targeting at 50% bitrate reduction as compared to HEVC, that has been finalized by the JVET at its 19th meeting ended at Jul. 1, 2020.

The Versatile Video Coding (VVC) standard (ITU-T H.266 I ISO/IEC 23090-3) and the associated Versatile Supplemental Enhancement Information (VSEI) standard (ITU-T H.274|ISO/IEC 23002-7) have been designed for use in a maximally broad range of applications, including both the traditional uses such as television broadcast, video conferencing, or playback from storage media, and also newer and more advanced use cases such as adaptive bit rate streaming, video region extraction, composition and merging of content from multiple coded video bitstreams, multiview video, scalable layered coding, and viewport-adaptive 360° immersive media.

3.2. File Format Standards

Media streaming applications are typically based on the IP, TCP, and HTTP transport methods, and typically rely on a file format such as the ISO base media file format (ISOBMFF). One such streaming system is dynamic adaptive streaming over HTTP (DASH). For using a video format with ISOBMFF and DASH, a file format specification specific to the video format, such as the AVC file format and the HEVC file format in ISO/IEC 14496-15 ("Information technology—Coding of audio-visual objects—Part 15: Carriage of network abstraction layer (NAL) unit structured video in the ISO base media file format"), would be needed for encapsulation of the video content in ISOBMFF tracks and in DASH representations and segments. Important information about the video bitstreams, e.g., the profile, tier, and level, and many others, would need to be exposed as file format level metadata and/or DASH media presentation description (MPD) for content selection purposes, e.g., for selection of appropriate media segments both for initialization at the beginning of a streaming session and for stream adaptation during the streaming session.

Similarly, for using an image format with ISOBMFF, a file format specification specific to the image format, such as the AVC image file format and the HEVC image file format in MPEG output document N19454 ("Information technology—Coding of audio-visual objects—Part 15: Carriage of network abstraction layer (NAL) unit structured video in the ISO base media file format—Amendment 2: Carriage of VVC and EVC in ISOBMFF", July 2020), would be needed.

The VVC video file format, the file format for storage of VVC video content based on ISOBMFF, is currently being developed by MPEG. The latest draft specification of the VVC video file format is included in MPEG output document N19460 ("Information technology—High efficiency coding and media delivery in heterogeneous environments—Part 12: Image File Format—Amendment 3: Support for VVC, EVC, slideshows and other improvements", July 2020).

The VVC image file format, the file format for storage of image content coded using VVC, based on ISOBMFF, is currently being developed by MPEG. The latest draft specification of the VVC image file format is included in [12].

3.3. Some Specifics of VVC Video File Format 3.3.1. Decoder Configuration Information 3.3.1.1. VVC Decoder Configuration Record 3.3.1.1.1. Definition This subclause specifies the decoder configuration information for ISO/IEC 23090-3 video content. This record contains the size of the length field used in each sample to indicate the length of its contained NAL units as well as the parameter sets, if stored in the sample entry. This record is externally framed (its size is supplied by the structure that contains it).

This record contains a version field. This version of the specification defines version 1 of this record. Incompatible changes to the record will be indicated by a change of version number. Readers shall not attempt to decode this record or the streams to which it applies if the version number is unrecognised. Compatible extensions to this record will extend it and will not change the configuration version code. Readers should be prepared to ignore unrecognised data beyond the definition of the data they understand. VvcPtlRecord shall be present in the decoder configuration record when the track contains a VVC bitstream natively or though resolving 'subp' track references. If the ptl_present_flag is equal to zero in the decoder configuration record of a track then the track shall have an 'oref' track reference.

The values for the syntax elements of VvcPTLRecord, chroma_format_idc, and bit_depth_minus8 shall be valid for all parameter sets that are activated when the stream described by this record is decoded (referred to as "all the parameter sets" in the following sentences in this paragraph). Specifically, the following restrictions apply:

The profile indication general_profile_idc shall indicate a profile to which the stream associated with this configuration record conforms.

NOTE 1: If the SPSs are marked with different profiles, then the stream could need examination to determine which profile, if any, the entire stream conforms to. If the entire stream is not examined, or the examination reveals that there is no profile to which the entire stream conforms, then the entire stream shall be split into two or more sub-streams with separate configuration records in which these rules can be met.

The tier indication general_tier_flag shall indicate a tier equal to or greater than the highest tier indicated in all the parameter sets.

Each bit in general_constraint_info may only be set if all the parameter sets set that bit.

The level indication general_level_idc shall indicate a level of capability equal to or greater than the highest level indicated for the highest tier in all the parameter sets.

The following constraints apply for chroma_format_idc:
  If the value of sps_chroma_format_idc, as defined in ISO/IEC 23090-3, is the same in all SPSs referenced by the NAL units of the track, chroma_format_idc shall be equal to sps_chroma_format_idc.
  Otherwise, if ptl_present_flag is equal to 1, chroma_format_idc shall be equal to vps_ols_dpb_chroma_format[output_layer_set_idx], as defined in ISO/IEC 23090-3.
  Otherwise, chroma_format_idc shall not be present.

The following constraints apply for bit_depth_minus8:
  If the value of sps_bitdepth_minus8, as defined in ISO/IEC 23090-3, is the same in all SPSs referenced by the NAL units of the track, bit_depth_minus8 shall be equal to sps_bitdepth_minus8.
  Otherwise, if ptl_present_flag is equal to 1, bit_depth_minus8 shall be equal to vps_ols_dpb_bitdepth_minus8[output_layer_set_idx], as defined in ISO/IEC 23090-3.
  Otherwise, bit_depth_minus8 shall not be present.

Explicit indication is provided in the VVC Decoder Configuration Record about the chroma format and bit depth as well as other important format information used by the VVC video elementary stream. If the two sequences differ in color space indications in their VUI information, then two different VVC sample entries are also required.

There is a set of arrays to carry initialization NAL units. The NAL unit types are restricted to indicate DCI, VPS, SPS, PPS, prefix APS, and prefix SEI NAL units only. NAL unit types that are reserved in ISO/IEC 23090-3 and in this specification may acquire a definition in future, and readers should ignore arrays with reserved or unpermitted values of NAL unit type.

NOTE 2: This 'tolerant' behaviour is designed so that errors are not raised, allowing the possibility of backwards-compatible extensions to these arrays in future specifications.

NOTE 3: The NAL units carried in a sample entry are included immediately following the AUD and OPI NAL units (if any) in, or otherwise at the beginning of, the access unit reconstructed from the first sample that references the sample entry.

It is recommended that the arrays be in the order DCI, VPS, SPS, PPS, prefix APS, prefix SEI.

3.3.1.1.2. Syntax

```
aligned(8) class VvcPTLRecord(num_sublayers) {
    unsigned int(8) num_bytes_constraint_info;
    unsigned int(7) general_profile_idc;
    unsigned int(1) general_tier_flag;
    unsigned int(8) general_level_idc;
    unsigned int(1) ptl_frame_only_constraint_flag;
    unsigned int(1) ptl_multilayer_enabled_flag;
    if (num_bytes_constraint_info > 0)
            unsigned int(8*num_bytes_constraint_info - 2)
general_constraint_info; for (i=num_sublayers - 2; i >= 0; i--)
            unsigned int(1) ptl_sublayer_level_present_flag[i];
    for (j=num_sublayers; j<=8 && num_sublayers > 1; j++)
            bit(1) ptl_reserved_zero_bit = 0;
    for (i=num_sublayers-2; i >= 0; i--)
        if (ptl_sublayer_level_present[i])
            unsigned int(8) sublayer_level_idc[i];
    unsigned int(8) num_sub_profiles;
    for (j=0; j < num_sub_profiles; j++)
            unsigned int(32) general_sub_profile_idc;
}
aligned(8) class VvcDecoderConfigurationRecord {
    unsigned int(8) configurationVersion = 1;
    unsigned int(16) avgFrameRate;
    unsigned int(2) constantFrameRate;
    unsigned int(3) numTemporalLayers;
    unsigned int(2) lengthSizeMinusOne;
    unsigned int(1) ptl_present_flag;
    if (ptl_present_flag) {
        VvcPTLRecord(numTemporalLayers) track_ptl;
        unsigned int(16) output_layer_set_idx;
    }
    unsigned int(1) chroma_format_present_flag;
    if (chroma_format_present_flag)
        unsigned int(2) chroma_format_idc;
    else
        bit(2) reserved = '11'b;
    unsigned int(1) bit_depth_present_flag;
    if (bit_depth_present_flag)
            unsigned int(3) bit_depth_minus8;
    else
        bit(3) reserved = '111'b;
    unsigned int(1) reserved= '1'b;
    unsigned int(8) numOfArrays;
    for (j=0; j < numOfArrays; j++) {
        unsigned int(1) array_completeness;
        bit(1) reserved = 0;
        unsigned int(6) NAL_unit_type;
        unsigned int(16) numNalus;
        for (i=0; i< numNalus; i++) {
            unsigned int(16) nalUnitLength;
            bit(8*nalUnitLength) nalUnit;
        }
    }
```

-continued

```
    }
}
```

3.3.1.1.3. Semantics general_profile_idc, general_tier_flag, general_sub_profile_idc, general_constraint_info, general_level_idc, ptl_frame_only_constraint_flag, ptl_multilayer_enabled_flag, sublayer_level_present, and sublayer_level_idc[i] contain the matching values for the fields general_profile_idc, general_tier_flag, general_sub_profile_idc, the bits in general_constraint_info( ), general_level_idc, ptl_multilayer_enabled_flag, ptl_frame_only_constraint_flag, sublayer_level_present, and sublayer_level_idc[i] as defined in ISO/IEC 23090-3, for the stream to which this configuration record applies.

avgFrameRate gives the average frame rate in units of frames/(256 seconds), for the stream to which this configuration record applies. Value 0 indicates an unspecified average frame rate.

constantFrameRate equal to 1 indicates that the stream to which this configuration record applies is of constant frame rate. Value 2 indicates that the representation of each temporal layer in the stream is of constant frame rate. Value 0 indicates that the stream may or may not be of constant frame rate.

numTemporalLayers greater than 1 indicates that the track to which this configuration record applies is temporally scalable and the contained number of temporal layers (also referred to as temporal sublayer or sublayer in ISO/IEC 23090-3) is equal to numTemporalLayers. Value 1 indicates that the track to which this configuration record applies is not temporally scalable. Value 0 indicates that it is unknown whether the track to which this configuration record applies is temporally scalable.

lengthSizeMinusOne plus 1 indicates the length in bytes of the NALUnitLength field in a VVC video stream sample in the stream to which this configuration record applies. For example, a size of one byte is indicated with a value of 0. The value of this field shall be one of 0, 1, or 3 corresponding to a length encoded with 1, 2, or 4 bytes, respectively.

ptl_present_flag equal to 1 specifies that the track contains a VVC bitstream corresponding to a specific output layer set. ptl_present_flag equal to 0 specifies that the track may not contain a VVC bitstream corresponding to a specific output layer set, but rather may contain one or more individual layers that do not form an output layer set or individual sublayers excluding the sublayer with TemporalId equal to 0.

num_sub_profiles defines the number of sub profiles indicated in the decoder configuration record.

track_ptl specifies the profile, tier, and level of the output layer set represented by the VVC bitstream contained in the track.

output_layer_set_idx specifies the output layer set index of an output layer set represented by the VVC bitstream contained in the track. The value of output_layer_set_idx may be used as the value of the TargetOlsIdx variable provided by external means to the VVC decoder, as specified in ISO/IEC 23090-3, for decoding the bitstream contained in the track.

chroma_format_present_flag equal to 0 specifies that chroma_format_idc is not present. chroma_format_present_flag equal to 1 specifies that chroma_format_idc is present.

chroma_format_idc indicates the chroma format that applies to this track. The following constraints apply for chroma_format_idc:
  If the value of sps_chroma_format_idc, as defined in ISO/IEC 23090-3, is the same in all SPSs referenced by the NAL units of the track, chroma_format_idc shall be equal to sps_chroma_format_idc.
  Otherwise, if ptl_present_flag is equal to 1, chroma_format_idc shall be equal to vps_ols_dpb_chroma_format[output_layer_set_idx], as defined in ISO/IEC 23090-3.
  Otherwise, chroma_format_idc shall not be present.

bit_depth_present_flag equal to 0 specifies that bit_depth_minus8 is not present. bit_depth_present_flag equal to 1 specifies that bit_depth_minus8 is present.

bit_depth_minus8 indicates the bit depth that applies to this track. The following constraints apply for bit_depth_minus8:
  If the value of sps_bitdepth_minus8, as defined in ISO/IEC 23090-3, is the same in all SPSs referenced by the NAL units of the track, bit_depth_minus8 shall be equal to sps_bitdepth_minus8.
  Otherwise, if ptl_present_flag is equal to 1, bit_depth_minus8 shall be equal to vps_ols_dpb_bitdepth_minus8[output_layer_set_idx], as defined in ISO/IEC 23090-3.
  Otherwise, bit_depth_minus8 shall not be present.

numArrays indicates the number of arrays of NAL units of the indicated type(s).

array_completeness when equal to 1 indicates that all NAL units of the given type are in the following array and none are in the stream; when equal to 0 indicates that additional NAL units of the indicated type may be in the stream; the default and permitted values are constrained by the sample entry name.

NAL_unit_type indicates the type of the NAL units in the following array (which shall be all of that type); it takes a value as defined in ISO/IEC 23090-2; it is restricted to take one of the values indicating a DCI, VPS, SPS, PPS, APS, prefix SEI, or suffix SEI NAL unit.

numNalus indicates the number of NAL units of the indicated type included in the configuration record for the stream to which this configuration record applies. The SEI array shall only contain SEI messages of a 'declarative' nature, that is, those that provide information about the stream as a whole. An example of such an SEI could be a user-data SEI.

nalUnitLength indicates the length in bytes of the NAL unit.

nalUnit contains a DCI, VPS, SPS, PPS, APS or declarative SEI NAL unit, as specified in ISO/IEC 23090-3.

3.3.2. Operating Points Information Sample Group
3.3.2.1. Definition

Applications are informed about the different operating points provided by a given VVC bitstream and their constitution by using the Operating Points Information sample group ('vopi'). Each operating point is related to an output layer set, a max TemporalId value, and a profile, level and tier signalling. All this information is captured by the 'vopi' sample group. Apart from this information, this sample group also provides the dependency information between layers.

When more than one VVC track is present for a VVC bitstream and no Operating Point entity group is present for the VVC bitstream, both of the following apply:
  Among the VVC tracks for the VVC bitstream there shall be one and only one track that carries a 'vopi' sample group.
  All the other VVC tracks of the VVC bitstream shall have a track reference of type 'oref' to the track that carries the 'vopi' sample group.

For any specific sample in a given track, the temporally collocated sample in another track is defined as the one with the same decoding time as that of this specific sample. For each sample $S_N$ in a track $T_N$ that has an 'oref' track reference to the track $T_k$ that carries the 'vopi' sample group, the following applies:
  If there is a temporally collocated sample $S_k$ in the track $T_k$, then the sample $S_N$ is associated with the same 'vopi' sample group entry as the sample $S_k$.
  Otherwise, the sample $S_N$ is associated with the same 'vopi' sample group entry as the last of the samples in the track $T_k$ that precede the sample $S_N$ in decoding time.

When several VPSs are referenced by a VVC bitstream, it may be needed to include several entries in the sample group description box with grouping_type 'vopi'. For more common cases where a single VPS is present, it is recommended to use the default sample group mechanism defined in ISO/IEC 14496-12 and include the operating points information sample group in the sample table box, rather than including it in each track fragment.

The grouping type parameter is not defined for the SampleToGroupBox with grouping type 'vopi'.

3.3.2.2. Syntax

```
class VvcOperatingPointsRecord {
    unsigned int(8) num_profile_tier_level_minus1;
    for (i=0; i<=num_profile_tier_level_minus1; i++) {
        unsigned int(8) ptl_max_temporal_id[i];
        VvcPTLRecord(ptl_max_temporal_id[i]+1) ptl[i];
    }
    unsigned int(1) all_independent_layers_flag;
    bit(7) reserved = 0;
    if (all_independent_layers_flag){
    unsigned int(1) each_layer_is_an_ols_flag;
        bit(7) reserved = 0;
    } else
        unsigned int(8) ols_mode_idc;
    unsigned int(16) num_operating_points;
    for (i=0; i<num_operating_points) {
        unsigned int(16) output_layer_set_idx;
        unsigned int(8) ptl_idx;
        unsigned int(8) max_temporal_id;
        unsigned int(8) layer_count;
        for (j=0; j<layer_count; j++) {
            unsigned int(6) layer_id;
            unsigned int(1) is_outputlayer;
            bit(1) reserved = 0;
        }
        bit(6) reserved = 0;
        unsigned int(1) frame_rate_info_flag
        unsigned int(1) bit_rate_info_flag
        if (frame_rate_info_flag) {
            unsigned int(16) avgFrameRate;
            bit(6) reserved = 0;
            unsigned int(2) constantFrameRate;
        }
        if (bit_rate_info_flag) {
            unsigned int(32) maxBitRate;
            unsigned int(32) avgBitRate;
        }
    }
    unsigned int(8) max_layer_count;
```

```
    for (i=0; i<max_layer_count; i++) {
        unsigned int(8) layerID;
        unsigned int(8) num_direct_ref_layers;
        for (j=0; j<num_direct_ref_layers; j++)
            unsigned int(8) direct_ref_layerID;
        unsigned int(8) max_tid_il_ref_pics_plus1;
    }
}
class VvcOperatingPointsInformation extends VisualSampleGroupEntry
('vopi') {
    VvcOperatingPointsRecord oinf;
}
```

3.3.2.3. Semantics num_profile_tier_level_minus1 plus 1 gives the number of following profiles, tier, and level combinations as well as the associated fields.

ptl_max_temporal_id[i]: Gives the maximum TemporalID of NAL units of the associated bitstream for the specified i-th profile, tier, and level structure.
  NOTE: The semantics of ptl_max_temporal_id[i] and max_temporal_id of an operating point, given below, are different even though they may carry the same numerical value.

ptl[i] specifies the i-th profile, tier, and level structure.

all_independent_layers_flag, each_layer_is_an_ols_flag, ols_mode_idc and max_tid_it_ref_pics_plus1 are defined in ISO/IEC 23090-3.

num_operating_points: Gives the number of operating points for which the information follows.

output_layer_set_idx is the index of the output layer set that defines the operating point. The mapping between output_layer_set_idx and the layer_id values shall be the same as specified by the VPS for an output layer set with index output_layer_set_idx.

ptl_idx: Signals the zero-based index of the listed profile, level, and tier structure for the output layer set with index output_layer_set_idx.

max_temporal_id: Gives the maximum TemporalId of NAL units of this operating point.
  NOTE: The maximum TemporalId value indicated in the layer information sample group has different semantics from the maximum TemporalId indicated here. However, they may carry the same literal numerical values.

layer_count: This field indicates the number of necessary layers, as defined ISO/IEC 23090-3, of this operating point.

layer_id: provides the nuh_layer_id values for the layers of the operating point.

is_outputlayer: A flag that indicates if the layer is an output layer or not. A one indicates an output layer.

frame_rate_info_flag equal to 0 indicates that no frame rate information is present for the operating point. The value 1 indicates that frame rate information is present for the operating point.

bit_rate_info_flag equal to 0 indicates that no bitrate information is present for the operating point. The value 1 indicates that bitrate information is present for the operating point.

avgFrameRate gives the average frame rate in units of frames/(256 seconds) for the operating point. Value 0 indicates an unspecified average frame rate.

constantFrameRate equal to 1 indicates that the stream of the operating point is of constant frame rate. Value 2 indicates that the representation of each temporal layer in the stream of the operating point is of constant frame rate. Value 0 indicates that the stream of the operating point may or may not be of constant frame rate.

maxBitRate gives the maximum bit rate in bits/second of the stream of the operating point, over any window of one second.

avgBitRate gives the average bit rate in bits/second of the stream of the operating point.

max_layer_count: The count of all unique layers in all of the operating points that relate to this associated base track.

layerID: nuh_layer_id of a layer for which the all the direct reference layers are given in the following loop of direct_ref_layerID.

num_direct_ref_layers: The number of direct reference layers for the layer with nuh_layer_id equal to layerID.

direct_ref_layerID: nuh_layer_id of the direct reference layer.

3.3.3. Operating Point Entity Group 3.3.3.1. General

The operating point entity group is defined to provide a mapping of tracks to operating points and profile level information of the operating points.

The implicit reconstruction process when aggregating samples of the tracks mapped to an operating point described in this entity group does not require removing any further NAL units to result in a conforming VVC bitstream. Tracks belonging to an Operating Point Entity Group shall have a track reference track reference of type 'oref' to the group_id indicated in the Operating Point Entity Group.

All the entity_id values included in the operating point entity groups shall belong to the same VVC bitstream. When present, OperatingPointGroupBox shall be contained in the GroupsListBox in the movie-level MetaBox and shall not be contained in file-level or track-level MetaBoxes.

3.3.3.2. Syntax

```
aligned(8) class OperatingPointGroupBox extends
EntityToGroupBox('opeg',0,0)
{
    unsigned int(8) num_profile_tier_level_minus1;
    for (i=0; i<=num_profile_tier_level_minus1; i++)
        VvcPTLRecord(0) opeg_ptl[i];
    unsigned int(16) num_operating_points;
    for (i=0; i<num_operating_points) {
        unsigned int(16) output_layer_set_idx;
        unsigned int(8) ptl_idx;
        unsigned int(8) max_temporal_id;
        unsigned int(8) layer_count;
        for (j=0; j<layer_count; j++) {
            unsigned int(6) layer_id;
            unsigned int(1) is_outputlayer;
            bit(1) reserved = 0;
        }
        bit(6) reserved = 0;
        unsigned int(1) frame_rate_info_flag
        unsigned int(1) bit_rate_info_flag
        if (frame_rate_info_flag) {
            unsigned int(16) avgFrameRate;
            bit(6) reserved = 0;
            unsigned int(2) constantFrameRate;
        }
        if (bit_rate_info_flag) {
            unsigned int(32) maxBitRate;
            unsigned int(32) avgBitRate;
        }
        unsigned int(8) entity_count;
        for (j=0; j<entity_count; j++) {
            unsigned int(8) entity_idx;
        }
    }
}
```

3.3.3.3. Semantics num_profile_tier_level_minus1 plus 1 gives the number of following profiles, tier, and level combinations as well as the associated fields.

opeg_ptl[i] specifies the i-th profile, tier, and level structure.

num_operating_points: Gives the number of operating points for which the information follows.

output_layer_set_idx is the index of the output layer set that defines the operating point. The mapping between output_layer_set_idx and the layer_id values shall be the same as specified by the VPS for an output layer set with index output_layer_set_idx.

ptl_idx: Signals the zero-based index of the listed profile, level, and tier structure for the output layer set with index output_layer_set_idx.

max_temporal_id: Gives the maximum TemporalId of NAL units of this operating point.

NOTE: The maximum TemporalId value indicated in the layer information sample group has different semantics from the maximum TemporalId indicated here. However, they may carry the same literal numerical values.

layer_count: This field indicates the number of necessary layers, as defined ISO/IEC 23090-3, of this operating point.

layer_id: provides the nuh_layer_id values for the layers of the operating point.

is_outputlayer: A flag that indicates if the layer is an output layer or not. A one indicates an output layer.

frame_rate_info_flag equal to 0 indicates that no frame rate information is present for the operating point. The value 1 indicates that frame rate information is present for the operating point.

bit_rate_info_flag equal to 0 indicates that no bitrate information is present for the operating point. The value 1 indicates that bitrate information is present for the operating point.

avgFrameRate gives the average frame rate in units of frames/(256 seconds) for the operating point. Value 0 indicates an unspecified average frame rate.

constantFrameRate equal to 1 indicates that the stream of the operating point is of constant frame rate. Value 2 indicates that the representation of each temporal layer in the stream of the operating point is of constant frame rate. Value 0 indicates that the stream of the operating point may or may not be of constant frame rate.

maxBitRate gives the maximum bit rate in bits/second of the stream of the operating point, over any window of one second.

avgBitRate gives the average bit rate in bits/second of the stream of the operating point.

entity_count specifies the number of tracks that are present in an operating point.

entity_idx specifies the index to the entity_id list in the entity group that belongs to an operating point.

4. EXAMPLES OF TECHNICAL PROBLEMS SOLVED BY DISCLOSED TECHNICAL SOLUTIONS

The latest designs of the VVC video file format regarding the signalling of picture format information have the following problems:

1) The VvcDecoderConfigurationRecord includes optional signalling of chroma format and bit depth, but not picture width and picture height, and the operating points information 'vopi' sample group entry and the operating point entity group 'opeg' box do not include any of these parameters.

However, when the PTL is signalled in a place, the chroma format, bit depth, as well as the picture width and picture height should also be signalled, as additional capability indications.

Note that the width and height fields of the visual sample entry are cropped frame width and height. Thus unless the cropping window offsets are all zero and the pictures are frames the values of the width and height won't be the same as the picture width and height of the decoded pictures.

Currently, cases like the following can occur:

a. A single-layer bitstream contained in one VVC track only, without an 'oref' track reference. Thus the VvcPtlRecord shall be present in the decoder configuration record. However, in this case, it is possible that some or all of the chroma format, bit depth, picture width and picture height are not signalled in any of the sample entry, the 'vopi' sample group entry, or the 'opeg' entity group box.

b. A multiple layer bitstream stored in multiple tracks, with the operating points information, including the PTL information for each operating point, stored in either 'vopi' sample group entries or 'opeg' entity group boxes, while none of the chroma format, bit depth, picture width and picture height is signalled any of the sample entry, the 'vopi' sample group entry, or the 'opeg' entity group box.

2) The parameter chroma_format_idc in VvcDecoderConfigurationRecord should be rather for capability indication instead of for decoding, as the parameter sets themselves are sufficient for decoding. And even for decoding, not only the chroma_format_idc in the SPSs is needed, but also the vps_ols_dpb_chroma_format[ ] for multiple layer OLSs is also needed. Therefore, herein really the maximum dpb_chroma_format should be signalled, while it is not the case in the current design. Similarly for the corresponding bit depth, picture width, and picture height parameters.

3) It is specified that when ptl_present_flag is equal to 1, chroma_format_idc shall be equal to vps_ols_dpb_chroma_format[output_layer_set_idx]. The following two issues exists (similarly for the corresponding bit depth parameter):

a. The value of vps_ols_dpb_chroma_format[ ] can be different for different CVSs. Therefore, it needs to either require that this is the same for all the VPSs, or specify that it is equal to or greater than the maximum.

b. The index value idx of vps_ols_dpb_chroma_format [idx] is an index to the list of multi-layer OLSs, thus it is incorrect to directly use output_layer_set_idx, which is an index to the list of all OLSs.

5. A LISTING OF TECHNICAL SOLUTIONS

To solve the above problems, methods as summarized below are disclosed. The items should be considered as examples to explain the general concepts and should not be interpreted in a narrow way. Furthermore, these items can be applied individually or combined in any manner.

1) Signal chroma_format_idc and bit_depth_minus8 in VvcDecoderConfigurationRecord when ptl_present_flag is equal to 1, and don't signal them in VvcDecoderConfigurationRecord when ptl_present_flag is equal to 0.

2) When the VVC stream to which the configuration record applies is a single-layer bitstream, the value of sps_chroma_format_idc shall be the same for all SPSs referenced by the VCL NAL units in the samples to which the current sample entry description applies, and the value of chroma_format_idc shall be equal to sps_chroma_format_idc.

3) When the VVC stream to which the configuration record apply is a multi-layer bitstream, the value of chroma_format_idc shall be equal to the greatest value of vps_ols_dpb_chroma_format[output_layer_set_idx] that applies to the OLS identified by output_layer_set_idx, for all the CVSs to which the current sample entry description applies.
   a. Alternatively, "equal to" above is changed to be "equal to or greater than".

4) When the VVC stream to which the configuration record apply is a single-layer bitstream, the value of sps_bitdepth_minus8 shall be the same for all SPSs referenced by the VCL NAL units in the samples to which the current sample entry description applies, and the value of bit_depth_minus8 shall be equal to sps_bitdepth_minus8.

5) When the VVC stream to which the configuration record apply is a multi-layer bitstream, the value of bit_depth_minus8 shall be equal to the greatest value of vps_ols_dpb_bitdepth_minus8[output_layer_set_idx] that applies to the OLS identified by output_layer_set_idx, for all the CVSs to which the current sample entry description applies.
   a. Alternatively, "equal to" above is changed to be "equal to or greater than".

6) Add signalling of picture_width and picture_height in VvcDecoderConfigurationRecord, similarly as the signalling of chroma_format_idc and bit_depth_minus8. And the picture_width and picture_height fields are both signalled using 16 bits.
   a. Alternatively, the picture_width and picture_height fields are both signalled using 24 bits.
   b. Alternatively, the picture_width and picture_height fields are both signalled using 32 bits.
   c. Alternatively, furthermore, when the VVC stream to which the configuration record apply is a single-layer bitstream, the signalling the picture_width and picture_height fields may be skipped when the cropping window offsets are all zero and the pictures are frames.

7) Add signalling of chroma_format_idc, bit_depth_minus8, picture_width and picture_height in VvcOperatingPointsRecord and OperatingPointGroupBox, for each operating point, e.g., immediately after ptl_idx, with similar semantics and constraints as above when present in VvcDecoderConfigurationRecord.

6. EMBODIMENTS

Below are some example embodiments for some of the invention aspects summarized above in Section 5, which can be applied to the standard specification for VVC video file format. The changed texts are based on the latest draft specification in MPEG output document N19454, "Information technology—Coding of audio-visual objects—Part 15: Carriage of network abstraction layer (NAL) unit structured video in the ISO base media file format—Amendment 2: Carriage of VVC and EVC in ISOBMFF", July 2020. Most relevant parts that have been added or modified are highlighted in bold and Italic, and some of the deleted parts are highlighted in double brackets (e.g., [[a]] denotes the deletion of the character 'a'). There may be some other changes that are editorial in nature and thus not highlighted.

6.1. First Embodiment
This embodiment is for items 1 to 7.
6.1.1. Decoder Configuration Information
6.1.1.1. VVC Decoder Configuration Record
6.1.1.1.1. Definition
This subclause specifies the decoder configuration information for ISO/IEC 23090-3 video content.

The following constraints apply for chroma_format_idc:
  If the VVC stream to which the configuration record applies is a single-layer bitstream, the value of sps_chroma_format_idc, as defined in ISO/IEC 23090-3, [[is]] shall be the same in all SPSs referenced by the VCL NAL units [[of the track]] in the samples to which the current sample entry description applies, and the value of chroma_format_idc shall be equal to sps_chroma_format_idc.
  Otherwise (the VVC stream to which the configuration record applies is a multi-layer bitstream), [[if ptl_present_flag is equal to 1,]] the value of chroma_format_idc shall be equal to the greatest value of vps_ols_dpb_chroma_format[MuftiLayerOlsIdx[output_layer_set_idx]], as defined in ISO/IEC 23090-3, that applies to the OLS identified by output_layer_set_idx, for all the CVSs to which the current sample entry description applies.
  [[Otherwise, chroma_format_idc shall not be present.

The following constraints apply for bit_depth_minus8:
  If the VVC stream to which the configuration record applies is a single-layer bitstream, the value of sps_bitdepth_minus8, as defined in ISO/IEC 23090-3, [[is]] shall be the same in all SPSs referenced by the VCL NAL units [[of the track]] in the samples to which the current sample entry description applies, and the value of bit_depth_minus8 shall be equal to sps_bitdepth_minus8.
  Otherwise(the VVC stream to which the configuration record applies is a multi-layer bitstream), [[if ptl_present_flag is equal to 1,]] the value of bit_depth_minus8 shall be equal to the greatest value of vps_ols_dpb_bitdepth_minus8[MultiLayerOlsIdx[output_layer_set_idx]], as defined in ISO/IEC 23090-3, that applies to the OLS identified by output_layer_set_idx, for all the CVSs to which the current sample entry description applies.
  [[Otherwise, bit_depth_minus8 shall not be present.]]

The following constraints apply for picture_width:
  If the VVC stream to which the configuration record applies is a single-layer bitstream, the value of sps_pic_width_max_in_luma_samples, as defined in ISO/IEC 23090-3, shall be the same in all SPSs referenced by the VCL NAL units in the samples to which the current sample entry description applies, and the value of picture_width shall be equal to sps_pic_width_max_in_luma_samples.
  Otherwise (the VVC stream to which the configuration record applies is a mufti-layer bitstream), the value of picture_width shall be equal to the greatest value of vps_ols_dpb_pic_width[MultiLayerOlsIdx[output_layer_set_idx]], as defined in ISO/IEC 23090-3, that applies to the OLS identified by output_layer_set_idx, for all the CVSs to which the current sample entry description applies.

The following constraints apply for picture_height:
  If the VVC stream to which the configuration record applies is a single-layer bitstream, the value of sps_pic_height_max_in_luma_samples, as defined in ISO/IEC 23090-3, shall be the same in all SPSs referenced by the VCL NAL units in the samples to which the current sample entry description applies, and the value of picture_height shall be equal to sps_pic_height_max_in_luma_samples.

Otherwise (the VVC stream to which the configuration record applies is a multi-layer bitstream), the value of picture_height shall be equal to the greatest value of vps_ols_dpb_pic_height [MultiLayerOlsIdx[output_layer_set_idx]], as defined in ISO/IEC 23090-3, that applies to the OLS identified by output_layer_set_idx, for all the CVSs to which the current sample entry description applies.

6.1.1.1.2. Syntax

```
aligned(8) class VvcPTLRecord(num_sublayers) {
    ...
}
aligned(8) class VvcDecoderConfigurationRecord {
    ...
    unsigned int(1) ptl_present_flag;
    if (ptl_present_flag) {
        VvcPTLRecord(numTemporalLayers) track_ptl;
        if (track_ptl.ptl_multilayer_enabled_flag)
            unsigned int(16) output_layer_set_idx;
[[ }
    unsigned int(1) chroma_format_present_flag;
    if (chroma_format_present_flag) ]]
        unsigned int(2) chroma_format_idc;
[[ else
        bit(2) reserved = '11'b;
    unsigned int(1) bit_depth_present_flag;
    if (bit_depth_present_flag) ]]
        unsigned int(3) bit_depth_minus8;
[[ else ]]
        bit(3) reserved = '111'b;
[[ unsigned int(1) reserved= '1'b;]]
        unsigned int(16) picture_width;
        unsigned int(16) picture_height;
    }
    unsigned int(8) numOfArrays;
    for (j=0; j < numOfArrays; j++) {
        unsigned int(1) array_completeness;
        bit(2) reserved = 0;
        unsigned int(5) NAL_unit_type;
        unsigned int(16) numNalus;
        for (i=0; i< numNalus; i++) {
            unsigned int(16) nalUnitLength;
            bit(8*nalUnitLength) nalUnit;
        }
    }
}
```

6.1.1.1.3. Semantics ptl_present_flag equal to 1 specifies that the track contains a VVC bitstream corresponding to a specific output layer set. ptl_present_flag equal to 0 specifies that the track may not contain a VVC bitstream corresponding to a specific output layer set, but rather may contain a VVC bitstream corresponding to multiple output layer sets or may contain one or more individual layers that do not form an output layer set or individual sublayers excluding the sublayer with TemporalId equal to 0.

track_ptl specifies the profile, tier, and level of the output layer set represented by the VVC bitstream contained in the track.

output_layer_set_idx specifies the output layer set index of an output layer set represented by the VVC bitstream contained in the track. The value of output_layer_set_idx may be used as the value of the TargetOlsIdx variable provided by external means to the VVC decoder, as specified in ISO/IEC 23090-3, for decoding the bitstream contained in the track. When ptl_present_flag is equal to 1 and output_layer_set_idx is not present, its value is inferred to be equal to the OLS index of the OLS that contains only the layer carried in the VVC track (after resolving referenced VVC tracks or VVC subpicture tracks, if any).

[[chroma_format_present_flag equal to 0 specifies that chroma_format_idc is not present. chroma_format_present_flag equal to 1 specifies that chroma_format_idc is present.]]

chroma_format_idc indicates the chroma format that applies to this track. [[The following constraints apply for chroma_format_idc:

If the value of sps_chroma_format_idc, as defined in ISO/IEC 23090-3, is the same in all SPSs referenced by the NAL units of the track, chroma_format_idc shall be equal to sps_chroma_format_idc.

Otherwise, if ptl_present_flag is equal to 1, chroma_format_idc shall be equal to vps_ols_dpb_chroma_format[output_layer_set_idx], as defined in ISO/IEC 23090-3.

Otherwise, chroma_format_idc shall not be present.

bit_depth_present_flag equal to 0 specifies that bit_depth_minus8 is not present. bit_depth_present_flag equal to 1 specifies that bit_depth_minus8 is present.]]

bit_depth_minus8 indicates the bit depth that applies to this track. [[The following constraints apply for bit_depth_minus8:

If the value of sps_bitdepth_minus8, as defined in ISO/IEC 23090-3, is the same in all SPSs referenced by the NAL units of the track, bit_depth_minus8 shall be equal to sps_bitdepth_minus8.

Otherwise, if ptl_present_flag is equal to 1, bit_depth_minus8 shall be equal to vps_ols_dpb_bitdepth_minus8[output_layer_set_idx], as defined in ISO/IEC 23090-3.

Otherwise, bit_depth_minus8 shall not be present.]]

picture_width indicates the maximum picture width, in units of luma samples, that applies to this track picture_height indicates the maximum picture height, in units of luma samples, that applies to this track numArrays indicates the number of arrays of NAL units of the indicated type(s).

array_completeness when equal to 1 indicates that all NAL units of the given type are in the following array and none are in the stream; when equal to 0 indicates that additional NAL units of the indicated type may be in the stream; the permitted values are constrained by the sample entry name.

NAL_unit_type indicates the type of the NAL units in the following array (which shall be all of that type); it takes a value as defined in ISO/IEC 23090-3; it is restricted to take one of the values indicating a DCI, VPS, SPS, PPS, prefix APS or prefix SEI NAL unit.

numNalus indicates the number of NAL units of the indicated type included in the configuration record for the stream to which this configuration record applies. The SEI array shall only contain SEI messages of a 'declarative' nature, that is, those that provide information about the stream as a whole. An example of such an SEI could be a user-data SEI.

nalUnitLength indicates the length in bytes of the NAL unit.

nalUnit contains a DCI, VPS, SPS, PPS, APS or declarative SEI NAL unit, as specified in ISO/IEC 23090-3.

6.1.2. Operating Points Information Sample Group
6.1.2.1. Definition
6.1.2.2. Syntax

```
class VvcOperatingPointsRecord {
    ...
    unsigned int(16) num_operating_points;
    for (i=0; i<num_operating_points) {
        unsigned int(16) output_layer_set_idx;
        unsigned int(8) ptl_idx;
        unsigned int(2) chroma_format_idc;
        unsigned int(3) bit_depth_minus8;
        bit(3)reserved ='111'b;
        unsigned_int(16)picture width;
        unsigned_int(16) picture_height;
        unsigned int(8) max_temporal_id;
    ...
}
class VvcOperatingPointsInformation extends VisualSampleGroupEntry
('vopi') {
    VvcOperatingPointsRecord oinf;
}
```

6.1.2.3. Semantics
- num_operating_points: Gives the number of operating points for which the information follows.
- output_layer_set_idx is the index of the output layer set that defines the operating point. The mapping between output_layer_set_idx and the layer_id values shall be the same as specified by the VPS for an output layer set with index output_layer_set_idx.
- ptl_idx: Signals the zero-based index of the listed profile, level, and tier structure for the output layer set with index output_layer_set_idx.
- chroma_format_idc indicates the chroma format that applies to this operating point. The following constraints apply for chroma_format_idc:
  - If this operating point contains only one layer, the value of sps_chroma_format_idc, as defined in ISO/IEC 23090-3, shall be the same in all SPSs referenced by the VCL NAL units in the WC bitstream of this operating point, and the value of chroma_format_idc shall be equal to sps_chroma_format_idc.
  - Otherwise (this operating point contains more than one layer), the value of chroma_format_idc shall be equal to the value of vps_ols_dpb_chroma_format[MultiLayerOlsIdx[output_layer_set_idx]], as defined in ISO/IEC 23090-3.
- bit_depth_minus8 indicates the bit depth that applies to this operating point. The following constraints apply for bit_depth_minus8:
  - If this operating point contains only one layer, the value of sps_bitdepth_minus8, as defined in ISO/IEC 23090-3, shall be the same in all SPSs referenced by the VCL NAL units in the WC bitstream of this operating point, and the value of bit_depth_minus8 shall be equal to sps_bitdepth_minus8.
  - Otherwise(this operating point contains more than one layer), the value of bit_depth_minus8 shall be equal to the value of vps_ols_dpb_bitdepth_minus8[MultiLayerOlsIdx[output_layer_set_idx]], as defined in ISO/IEC 23090-3.
- picture_width indicates the maximum picture width, in units of luma samples, that applies to this operating point. The following constraints apply for picture_width:
  - If this operating point contains only one layer, the value of sps_pic width max in luma samples, as defined in ISO/IEC 23090-3, shall be the same in all SPSs referenced by the VCL NAL units in the VVC bitstream of this operating point, and the value of picture_width shall be equal to sps_pic_width_max_in_luma_samples.
  - Otherwise (this operating point contains more than one layer), the value of picture width shall be equal to the value of vps_ols_dpb_pic_width[MultiLayerOlsIdx[output_layer_set_idx]], as defined in ISO/IEC 23090-3,
- picture_height indicates the maximum picture height, in units of luma samples, that applies to this operating point. The following constraints apply for picture_height:
  - If this operating point contains only one layer, the value of sps_pic_height_max_in_luma_samples, as defined in ISO/IEC 23090-3, shall be the same in all SPSs referenced by the VCL NAL units in the VVC bitstream of this operating point, and the value of picture_height shall be equal to sps_pic_height_max_in_luma_samples.
  - Otherwise (this operating point contains more than one layer), the value of picture_height shall be equal to the value of vps_ols_dpb_pic_height[MuftiLayerOlsIdx[output_layer_set_idx]], as defined in ISO/IEC 23090-3,
- max_temporal_id: Gives the maximum TemporalId of NAL units of this operating point.
  - NOTE: The maximum TemporalId value indicated in the layer information sample group has different semantics from the maximum TemporalId indicated here. However, they may carry the same literal numerical values.

6.1.3. Operating Point Entity Group
6.1.3.1. General

The operating point entity group is defined to provide a mapping of tracks to operating points and profile level information of the operating points.

The implicit reconstruction process when aggregating samples of the tracks mapped to an operating point described in this entity group does not require removing any further NAL units to result in a conforming VVC bitstream. Tracks belonging to an Operating Point Entity Group shall have a track reference track reference of type 'oref' to the group id indicated in the Operating Point Entity Group.

All the entity_id values included in the operating point entity groups shall belong to the same VVC bitstream. When present, OperatingPointGroupBox shall be contained in the GroupsListBox in the movie-level MetaBox and shall not be contained in file-level or track-level MetaBoxes.

6.1.3.2. Syntax

```
aligned(8) class OperatingPointGroupBox extends
EntityToGroupBox('opeg',0,0)
{
    ...
    unsigned int(16) num operating points;
    for (i=0; i<num operating points) {
        unsigned int(16) output_layer_set_idx;
        unsigned int(8) ptl_idx;
        unsigned int(2) chroma_format_idc;
        unsigned int(3) bit_depth_minus8;
        bit(3)reserved ='111'b;
        unsigned_int(16)picture width;
        unsigned_int(16) picture_height;
        unsigned int(8) max_temporal_id;
    ...
    }
}
```

6.1.3.3. Semantics
  num_operating_points: Gives the number of operating points for which the information follows.
  output_layer_set_idx is the index of the output layer set that defines the operating point. The mapping between output_layer_set_idx and the layer_id values shall be the same as specified by the VPS for an output layer set with index output_layer_set_idx.
  ptl_idx: Signals the zero-based index of the listed profile, level, and tier structure for the output layer set with index output_layer_set_idx.
  chrome_format_idc indicates the chroma format that applies to this operating point. The following constraints apply for chrome_format_idc:
    If this operating point contains only one layer, the value of sps_chroma_format_idc, as defined in ISO/IEC 23090-3, shall be the same in all SPSs referenced by the VCL NAL units in the VVC bitstream of this operating point, and the value of chrome_format_idc shall be equal to sps_chroma_format_idc.
    Otherwise (this operating point contains more than one layer), the value of chroma_format_idc shall be equal to the value of vps_ols_dpb_chroma_format[MultiLayerOlsIdx[output_layer_set_idx]], as defined in ISO/IEC 23090-3.
  bit_depth_minus8 indicates the bit depth that applies to this operating point. The following constraints apply for bit_depth_minus8:
    If this operating point contains only one layer, the value of sps_bitdepth_minus8, as defined in ISO/IEC 23090-3, shall be the same in all SPSs referenced by the VCL NAL units in the VVC bitstream of this operating point, and the value of bit_depth_minus8 shall be equal to sps_bitdepth_minus8.
    Otherwise(this operating point contains more than one layer), the value of bit_depth_minus8 shall be equal to the value of vps_ols_dpb_bitdepth_minus8[MultiLayerOlsIdx[output_layer_set_idx]], as defined in ISO/IEC 23090-3.
  picture_width indicates the maximum picture width, in units of luma samples, that applies to this operating point. The following constraints apply for picture_width:
    If this operating point contains only one layer, the value of sps_pic_width_max_in_luma_samples, as defined in ISO/IEC 23090-3, shall be the same in all SPSs referenced by the VCL NAL units in the WC bitstream of this operating point, and the value of picture_width shall be equal to sps_pic_width_max_in_luma_samples.
    Otherwise (this operating point contains more than one layer), the value of picture_width shall be equal to the value of vps_ols_dpb_pic_width[MultiLayerOlsIdx[output_layer_set_idx]], as defined in ISO/IEC 23090-3,
  picture_height indicates the maximum picture height, in units of luma samples, that applies to this operating point. The following constraints apply for picture_height:
    If this operating point contains only one layer, the value of sps_pic_height_max_in_luma_samples, as defined in ISO/IEC 23090-3, shall be the same in all SPSs referenced by the VCL NAL units in the WC bitstream of this operating point, and the value of picture_height shall be equal to sps_pic_height_max_in_luma_samples.
    Otherwise (this operating point contains more than one layer), the value of picture_height shall be equal to the value of vps_ols_dpb_pic_height[MuftiLayerOlsIdx[output_layer_set_idx]], as defined in ISO/IEC 23090-3,
  max_temporal_id: Gives the maximum TemporalId of NAL units of this operating point.
    NOTE: The maximum TemporalId value indicated in the layer information sample group has different semantics from the maximum TemporalId indicated here. However, they may carry the same literal numerical values.

FIG. 1 is a block diagram showing an example video processing system 1900 in which various techniques disclosed herein may be implemented. Various implementations may include some or all of the components of the system 1900. The system 1900 may include input 1902 for receiving video content. The video content may be received in a raw or uncompressed format, e.g., 8 or 10 bit multi-component pixel values, or may be in a compressed or encoded format. The input 1902 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 1900 may include a coding component 1904 that may implement the various coding or encoding methods described in the present document. The coding component 1904 may reduce the average bitrate of video from the input 1902 to the output of the coding component 1904 to produce a coded representation of the video. The coding techniques are therefore sometimes called video compression or video transcoding techniques. The output of the coding component 1904 may be either stored, or transmitted via a communication connected, as represented by the component 1906. The stored or communicated bitstream (or coded) representation of the video received at the input 1902 may be used by the component 1908 for generating pixel values or displayable video that is sent to a display interface 1910. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

Figure 2:
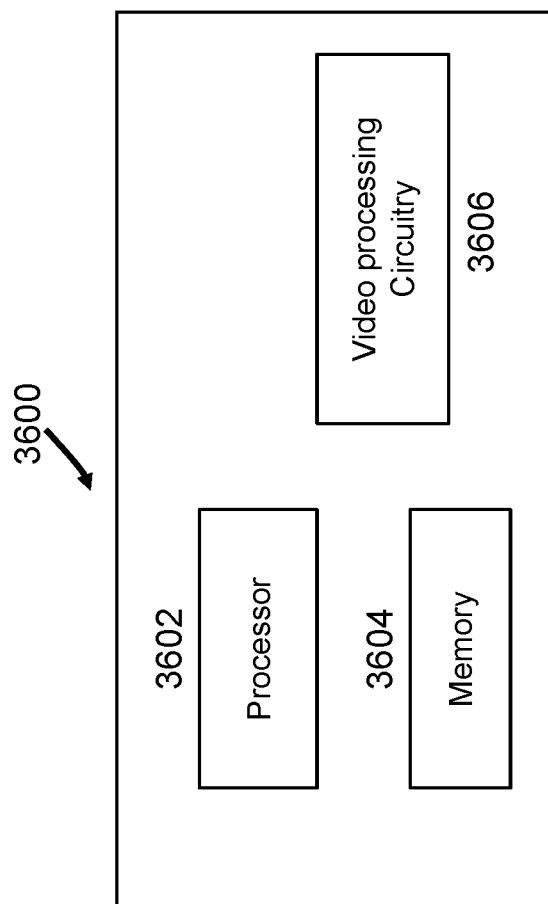
FIG. 2 is a block diagram of a video processing apparatus.

FIG. 2 is a block diagram of a video processing apparatus 3600. The apparatus 3600 may be used to implement one or more of the methods described herein. The apparatus 3600 may be embodied in a smartphone, tablet, computer, Internet of Things (IoT) receiver, and so on. The apparatus 3600 may include one or more processors 3602, one or more memories 3604 and video processing hardware 3606. The processor(s) 3602 may be configured to implement one or more methods described in the present document. The memory (memories) 3604 may be used for storing data and code used for implementing the methods and techniques described herein. The video processing hardware 3606 may be used to implement, in hardware circuitry, some techniques described in the present document. In some embodiments, the video processing hardware 3606 may be at least partly included in the processor 3602, e.g., a graphics co-processor.

Figure 4:
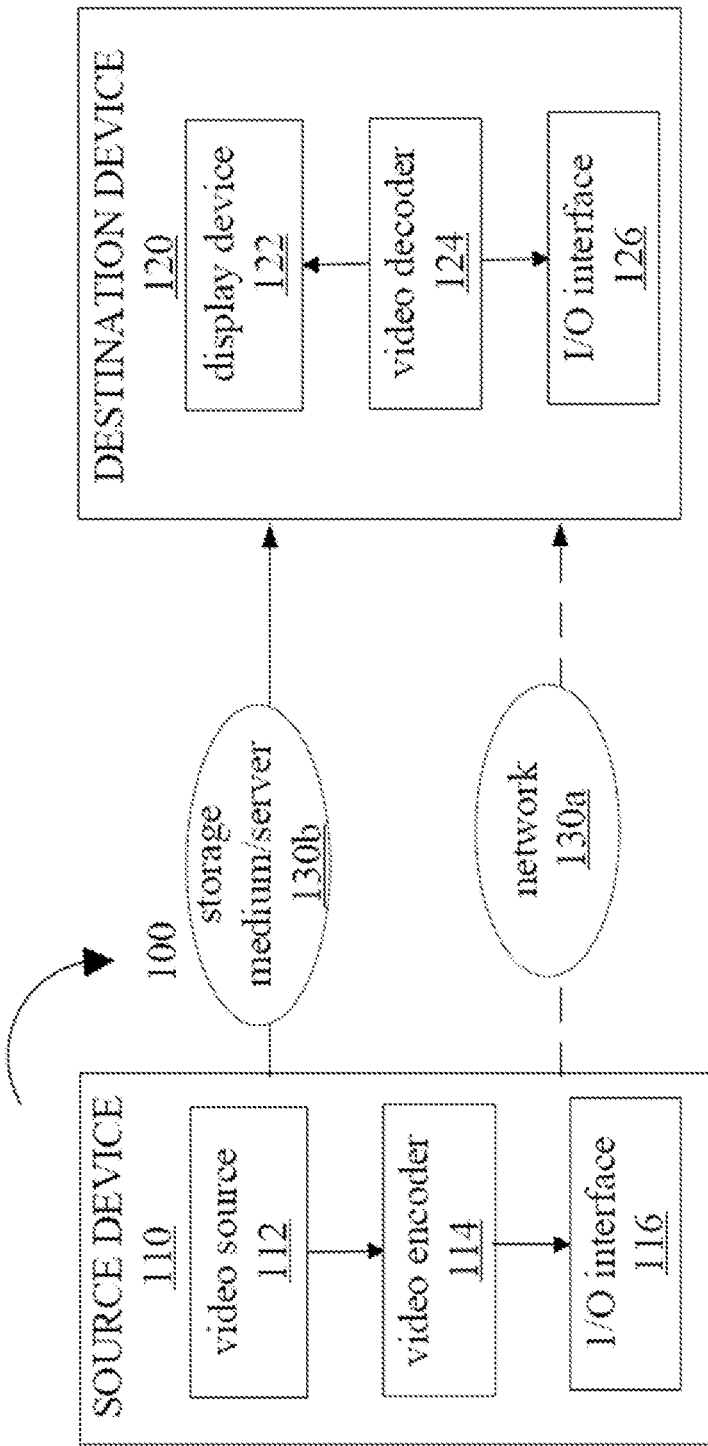
FIG. 4 is a block diagram that illustrates a video coding system in accordance with some embodiments of the present disclosure.

FIG. 4 is a block diagram that illustrates an example video coding system 100 that may utilize the techniques of this disclosure.

As shown in FIG. 4, video coding system 100 may include a source device 110 and a destination device 120. Source device 110 generates encoded video data which may be referred to as a video encoding device. Destination device 120 may decode the encoded video data generated by source device 110 which may be referred to as a video decoding device.

Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources. The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130*a*. The encoded video data may also be stored onto a storage medium/server 130*b* for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130*b*. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the High Efficiency Video Coding (HEVC) standard, Versatile Video Coding (VVM) standard and other current and/or further standards.

Figure 5:
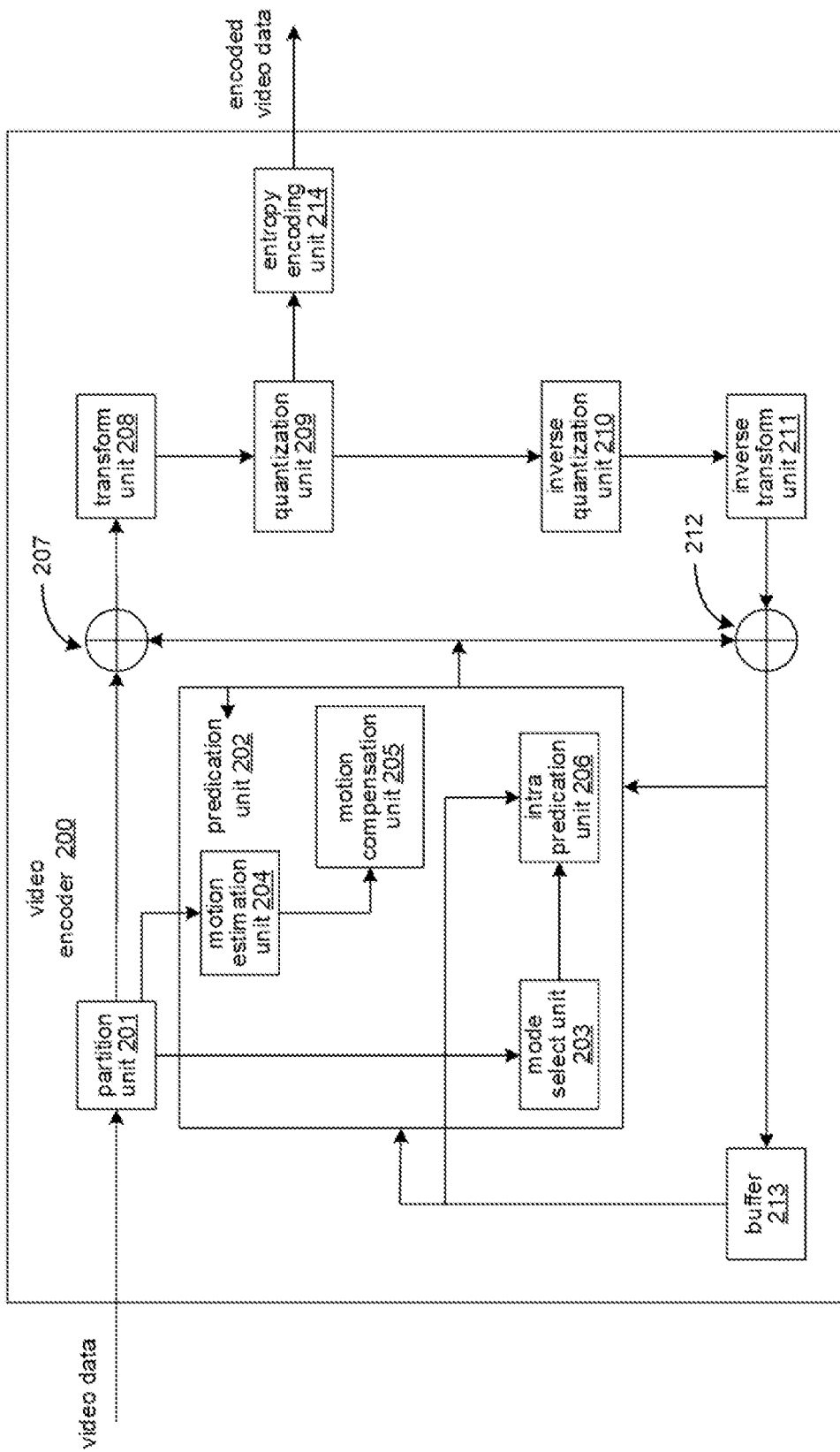
FIG. 5 is a block diagram that illustrates an encoder in accordance with some embodiments of the present disclosure.

FIG. 5 is a block diagram illustrating an example of video encoder 200, which may be video encoder 114 in the system 100 illustrated in FIG. 4.

Video encoder 200 may be configured to perform any or all of the techniques of this disclosure. In the example of FIG. 5, video encoder 200 includes a plurality of functional components. The techniques described in this disclosure may be shared among the various components of video encoder 200. In some examples, a processor may be configured to perform any or all of the techniques described in this disclosure.

The functional components of video encoder 200 may include a partition unit 201, a predication unit 202 which may include a mode select unit 203, a motion estimation unit 204, a motion compensation unit 205 and an intra prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, video encoder 200 may include more, fewer, or different functional components. In an example, predication unit 202 may include an intra block copy (IBC) unit. The IBC unit may perform predication in an IBC mode in which at least one reference picture is a picture where the current video block is located.

Furthermore, some components, such as motion estimation unit 204 and motion compensation unit 205 may be highly integrated, but are represented in the example of FIG. 5 separately for purposes of explanation.

Partition unit 201 may partition a picture into one or more video blocks. Video encoder 200 and video decoder 300 may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some example, Mode select unit 203 may select a combination of intra and inter predication (CIIP) mode in which the predication is based on an inter predication signal and an intra predication signal. Mode select unit 203 may also select a resolution for a motion vector (e.g., a sub-pixel or integer pixel precision) for the block in the case of inter-predication.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may do not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as another video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector predication (AMVP) and merge mode signaling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the predication unit 202 to produce a reconstructed video block associated with the current block for storage in the buffer 213.

After reconstruction unit 212 reconstructs the video block, loop filtering operation may be performed reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 6:
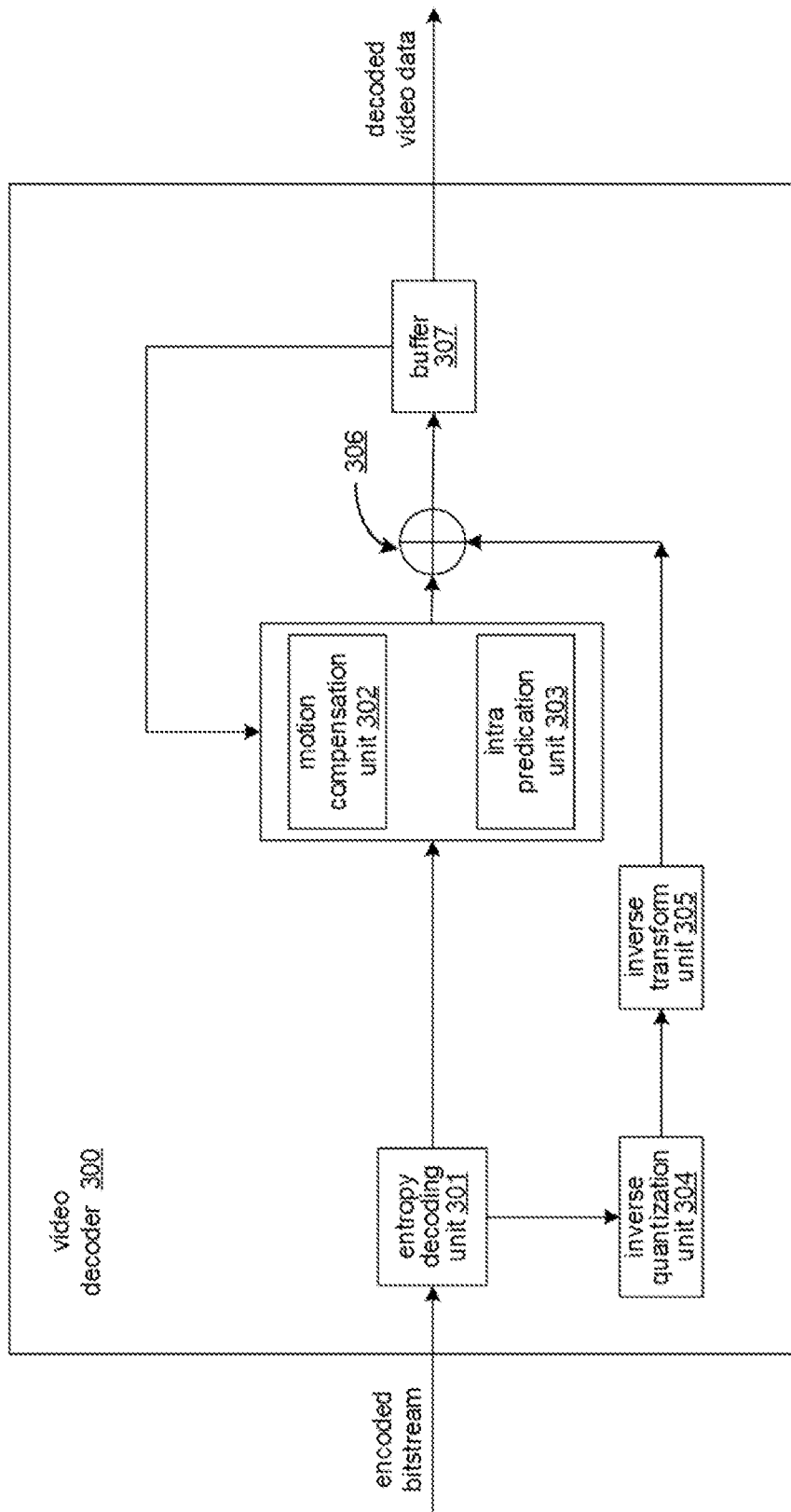
FIG. 6 is a block diagram that illustrates a decoder in accordance with some embodiments of the present disclosure.
Figure 7:
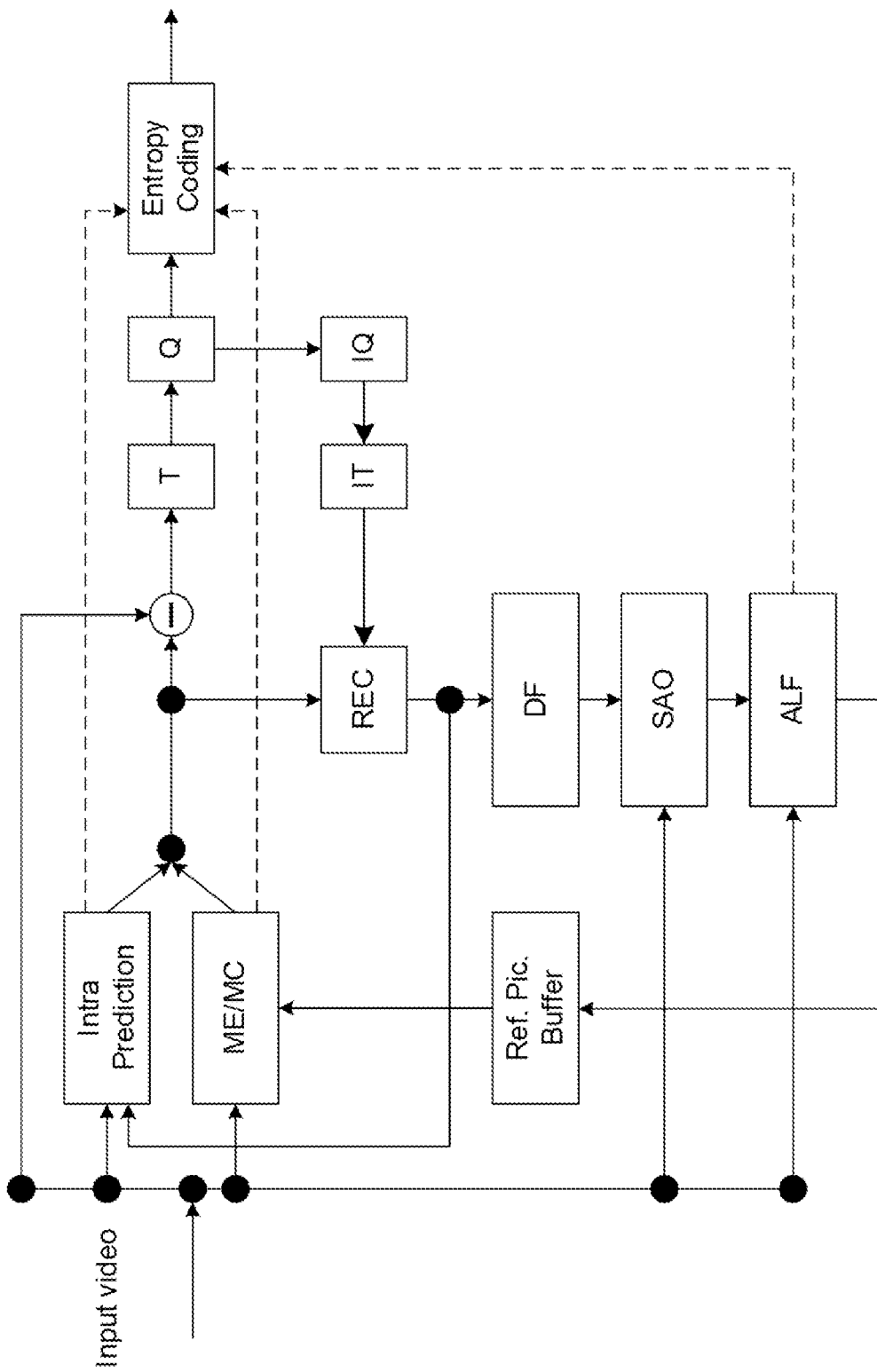
FIG. 7 shows an example of encoder block diagram.

FIG. 6 is a block diagram illustrating an example of video decoder 300 which may be video decoder 114 in the system 100 illustrated in FIG. 4.

The video decoder 300 may be configured to perform any or all of the techniques of this disclosure. In the example of FIG. 6, the video decoder 300 includes a plurality of functional components. The techniques described in this disclosure may be shared among the various components of the video decoder 300. In some examples, a processor may be configured to perform any or all of the techniques described in this disclosure.

In the example of FIG. 6, video decoder 300 includes an entropy decoding unit 301, a motion compensation unit 302, an intra prediction unit 303, an inverse quantization unit 304, an inverse transformation unit 305, and a reconstruction unit 306 and a buffer 307. Video decoder 300 may, in some examples, perform a decoding pass generally reciprocal to the encoding pass described with respect to video encoder 200 (FIG. 5).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 200 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may uses some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 303 inverse quantizes, i.e., de-quantizes, the quantized video block coefficients provided in the bitstream and decoded by entropy decoding unit 301. Inverse transform unit 303 applies an inverse transform.

Reconstruction unit 306 may sum the residual blocks with the corresponding prediction blocks generated by motion compensation unit 202 or intra-prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation/intra predication and also produces decoded video for presentation on a display device.

A listing of solutions preferred by some embodiments is provided next.

A first set of solutions is provided below. The following solutions show example embodiments of techniques discussed in the previous section (e.g., item 1).

Figure 3:
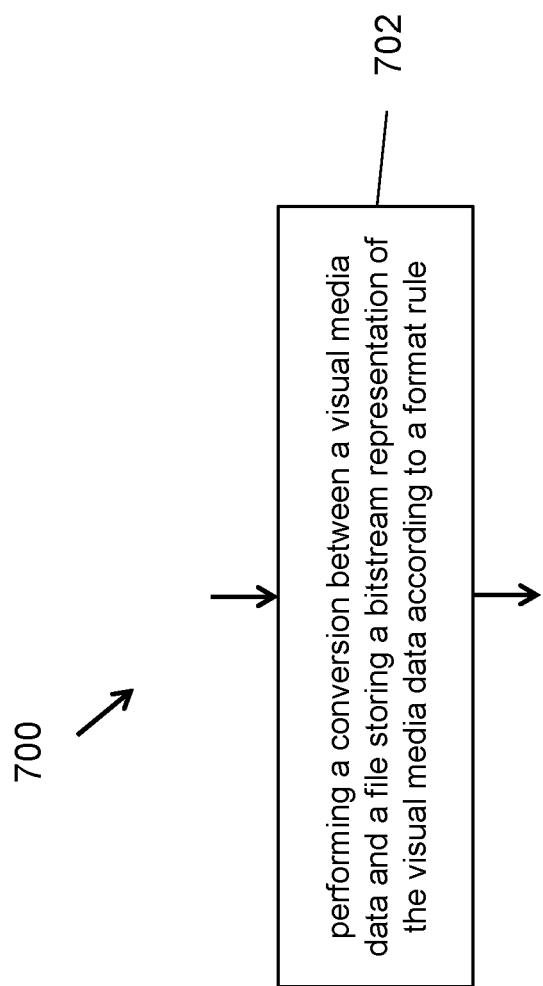
FIG. 3 is a flowchart for an example method of video processing.

1. A visual media processing method (e.g., method 700 depicted in FIG. 3), comprising performing (702) a conversion between a visual media data and a file storing a bitstream representation of the visual media data according to a format rule; wherein the format rule specifies that a first record indicative of whether a profile-tier-level is indicated in the file controls whether a second record indicative of a chroma format of the visual media data and/or a third record indictive of a bit depth used for representing the visual media data is included in the file.

The following solutions show example embodiments of techniques discussed in the previous section (e.g., items 2, 4).

1. A visual media processing method, comprising: performing a conversion between a visual media data and a file storing a bitstream representation of the visual media data according to a format rule; wherein the bitstream representation is a single layer bitstream; wherein the format rule specifies a constraint on the single layer bitstream stored in the file.

2. The method of solution 1, wherein the constraint is that one or more chroma format values indicated in one or more sequence parameter sets references by video coding layer network abstraction layer units includes in samples of the file are equal.

3. The method of solution 1, wherein the constraint is that one or more bitdepth values indicated in one or more sequence parameter sets references by video coding layer network abstraction layer units includes in samples of the file are equal.

The following solutions show example embodiments of techniques discussed in the previous section (e.g., items 3, 5).

1. A visual media processing method, comprising: performing a conversion between a visual media data and a file storing a bitstream representation of the visual media data according to a format rule; wherein the bitstream representation is a multi-layer bitstream wherein the format rule specifies a constraint on the multi-layer bitstream stored in the file.

2. The method of solution 1, wherein the constraint is that a value of a chroma format is set to be equal to a maximum value of chroma format identified in a sample entry description of an output layer set for all coded video sequences to which the sample entry description applies.

3. The method of solution 1, wherein the constraint is that a value of a bitdepth is set to be equal to a maximum value of bitdepth identified in a sample entry description of an output layer set for all coded video sequences to which the sample entry description applies.

8. The method of any of solutions 1-7, wherein the conversion comprises generating a bitstream representation of the visual media data and storing the bitstream representation to the file according to the format rule.

9. The method of any of solutions 1-7, wherein the conversion comprises parsing the file according to the format rule to recover the visual media data.

10. A video decoding apparatus comprising a processor configured to implement a method recited in one or more of solutions 1 to 9.

11. A video encoding apparatus comprising a processor configured to implement a method recited in one or more of solutions 1 to 9.

12. A computer program product having computer code stored thereon, the code, when executed by a processor, causes the processor to implement a method recited in any of solutions 1 to 9.

13. A computer readable medium on which a bitstream complying to a file format that is generated according to any of solutions 1 to 9.

14. A method, apparatus or system described in the present document. In the solutions described herein, an encoder may conform to the format rule by producing a coded representation according to the format rule. In the solutions described herein, a decoder may use the format rule to parse syntax elements in the coded representation with the knowledge of presence and absence of syntax elements according to the format rule to produce decoded video.

A second set of solutions provides example embodiments of techniques discussed in the previous section (e.g., items 1-5).

Figure 8:
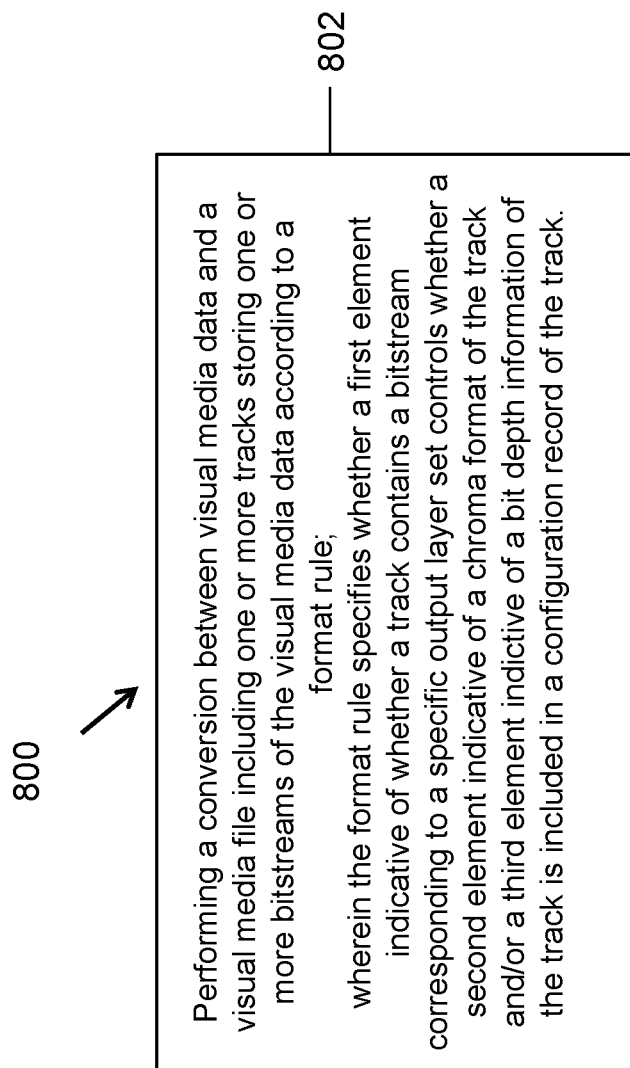
FIGS. 8-10 show example methods of processing visual media data based on some implementations of the disclosed technology.

1. A method of processing visual media data (e.g., method 800 as shown in FIG. 8), comprising: performing 802 a conversion between visual media data and a visual media file including one or more tracks storing one or more bitstreams of the visual media data according to a format rule; wherein the format rule specifies whether a first element indicative of whether a track contains a bitstream corresponding to a specific output layer set controls whether a second element indicative of a chroma format of the track and/or a third element indictive of a bit depth information of the track is included in a configuration record of the track.

2. The method of solution 1, wherein the format rule specifies to include the second element and/or the third element in response to the first element indicating that the track contains the bitstream corresponding to the specific output layer set.

3. The method of solution 1, wherein the format rule specifies to omit the second element and/or the third element in response to the first element indicating that the track is allowed not to contain the bitstream corresponding to the specific output layer set.

4. The method of solution 1, wherein the format rule further specifies a syntax constraint depending on whether a bitstream to which a configuration record applies is a multi-layer bitstream.

5. The method of solution 4, wherein the format rule further specifies that, in response to the bitstream not being the multi-layer bitstream, the syntax constraint is that one or more chroma format values indicated in one or more sequence parameter sets referenced by NAL (network abstraction layer) units included in samples of the visual media file to which a sample entry description of the configuration record applies are equal.

6. The method of solution 5, wherein the format rule further specifies that a chroma format value indicated in the configuration record is equal to the one or more chroma format values.

7. The method of solution 4, wherein the format rule further specifies that, in response to the bitstream being the multi-layer bitstream, the syntax constraint is that a value of a chroma format indicated in the configuration record is set to be equal to a maximum value of a chroma format that is indicated in a video parameter set and applies to an output layer set identified by an output layer set index, among all chroma format values indicated in all video parameter sets for all coded video sequences to which a sample entry description of the configuration record applies.

8. The method of solution 4, wherein the format rule further specifies, in response to the bitstream not being the multi-layer bitstream, that one or more bit depth information values indicated in one or more sequence parameter sets referenced by NAL (network abstraction layer) units included in samples of the visual media file to which a sample entry description of the configuration record applies are equal.

9. The method of solution 8, wherein the format rule further specifies that a bit depth information value indicated in the configuration record is equal to the one or more bit depth information values.

10. The method of solution 4, wherein the format rule further specifies that, in response to the bitstream being the multi-layer bitstream, the syntax is constraint that a bit depth information value indicated in the configuration record is set to be equal to a maximum value of bit depth information that is indicated in a video parameter set and applies to an output layer set identified by an output layer set index, among all bit depth information values indicated in all video parameter sets for all coded video sequences to which a sample entry description of the configuration record applies.

11. The method of any one of solutions 1-10, wherein the conversion comprises generating the visual media file and storing the one or more bitstreams to the visual media file according to the format rule.

12. The method of any one of solutions 1-10, wherein the conversion comprises parsing the visual media file according to the format rule to reconstruct the one or more bitstreams.

13. An apparatus of processing visual media data, comprising a processor configured to implement a method comprising: performing a conversion between visual media data and a visual media file including one or more tracks storing one or more bitstreams of the visual media data according to a format rule, wherein the format rule specifies a presence of a chroma format syntax element and/or a bit depth syntax element or a syntax constraint on the chroma format syntax element and/or the bit depth syntax element depending on (1) whether a track contains a specific bitstream corresponding to a specific output layer set and/or (2) whether a bitstream to which a configuration record applies is a multi-layer bitstream.

14. The apparatus of solution 13, wherein the format rule specifies to include the chroma format syntax element and/or the bit depth syntax element in the configuration record of the track in case that the track contains the specific bitstream corresponding to the specific output layer set.

15. The apparatus of solution 13, wherein the format rule specifies to omit the chroma format syntax element and/or the bit depth syntax element from the configuration record of the track in case that the track is allowed not to contain the bitstream corresponding to the specific output layer set.

16. The apparatus of solution 13, wherein the format rule specifies that, in response to the bitstream not being the multi-layer bitstream, the syntax constraint is that values of one or more chroma format syntax elements indicated in one or more sequence parameter sets referenced by NAL (network abstraction layer) units included in samples of the visual media file to which a sample entry description of the configuration record applies are equal.

17. The apparatus of solution 13, wherein the format rule specifies that, in response to the bitstream being the multi-layer bitstream, the syntax constraint is that a value of the chroma format indicated in the configuration record is set to be equal to a maximum value of a chroma format that is indicated in a video parameter set and applies to an output layer set identified by an output layer set index, among all chroma format values indicated in all video parameter sets for all coded video sequences to which a sample entry description of the configuration record applies.

18. The apparatus of solution 13, wherein the format rule specifies that, in response to the bitstream not being the multi-layer bitstream, the syntax constraint is that values of one or more bit depth syntax elements indicated in one or more sequence parameter sets referenced by NAL (network abstraction layer) units included in samples of the visual media file to which a sample entry description of the configuration record applies are equal.

19. The apparatus of solution 13, wherein the format rule specifies that, in response to the bitstream being the multi-layer bitstream, the syntax constraint is that a value of the bit depth syntax element is set to be equal to or greater than a maximum value of bit depth information that is indicated in a video parameter set and applies to an output layer set identified by an output layer set index, among all bit depth information values indicated in all video parameter sets for all coded video sequences to which a sample entry description of the configuration record applies.

20. A non-transitory computer-readable recording medium storing instructions that cause a processor to: perform a conversion between visual media data and a visual media file including one or more tracks storing one or more bitstreams of the visual media data according to a format rule, wherein the format rule specifies a presence of a chroma format syntax element and/or a bit depth syntax element or a syntax constraint on the chroma format syntax element and/or the bit depth syntax element depending on (1) whether a track contains a specific bitstream corresponding to a specific output layer set and/or (2) whether a bitstream to which a configuration record applies is a multi-layer bitstream.

21. A non-transitory computer-readable recording medium storing a bitstream which is generated by a method performed by a video processing apparatus, wherein the method comprises: generating a visual media file that includes one or more tracks that store one or more bitstreams of visual media data according to a format rule, wherein the format rule specifies a presence of a chroma format syntax element and/or a bit depth syntax element or a syntax constraint on the chroma format syntax element and/or the bit depth syntax element depending on (1) whether a track contains a specific bitstream corresponding to a specific output layer set and/or (2) whether a bitstream to which a configuration record applies is a multi-layer bitstream.

22. A video processing apparatus comprising a processor configured to implement a method recited in any one or more of solutions 1 to 12.

23. A method of storing visual media data to a file including one or more bitstreams, the method comprising a method recited in any one of solutions 1 to 12, and further including storing the one or more bitstream to a non-transitory computer-readable recording medium.

24. A computer readable medium storing program code that, when executed, causes a processor to implement a method recited in any one or more of solutions 1 to 12.

25. A computer readable medium that stores a bitstream generated according to any of the above described methods.

26. A video processing apparatus for storing a bitstream, wherein the video processing apparatus is configured to implement a method recited in any one or more of solutions 1 to 12.

27. A computer readable medium on which a bitstream complying to a file format that is generated according to any of solutions 1 to 12.

28. A method, apparatus or system described in the present document.

A third set of solutions provides example embodiments of techniques discussed in the previous section (e.g., item 6).

Figure 9:
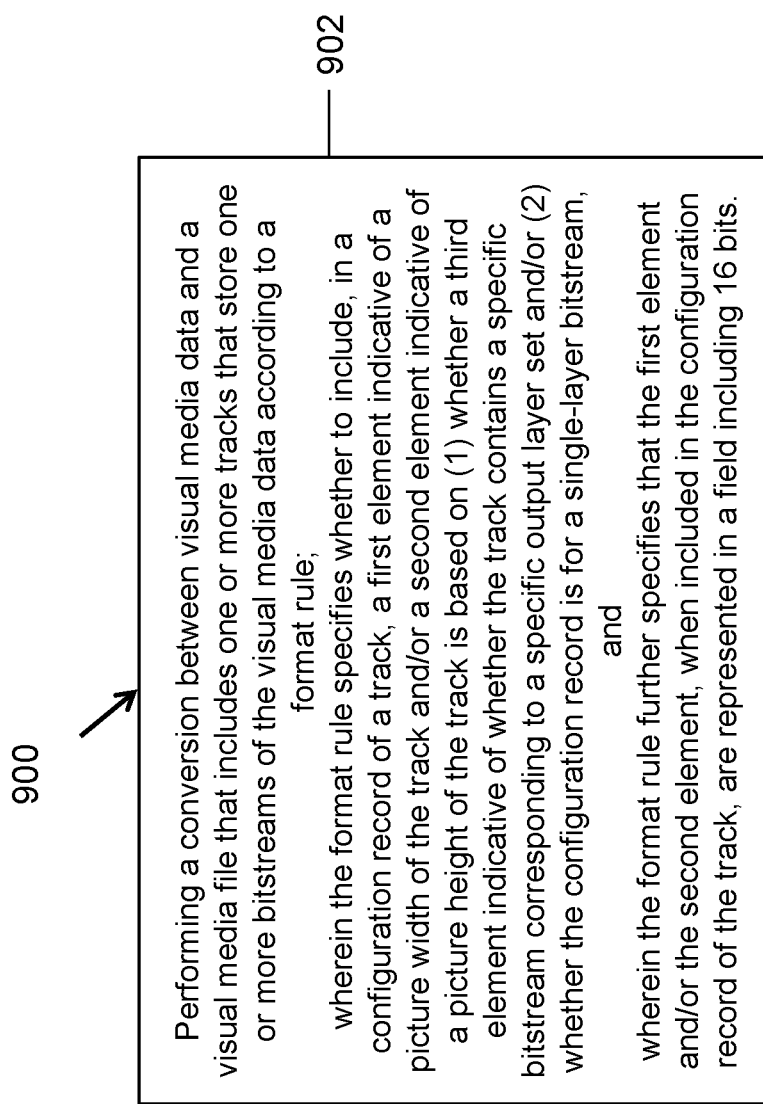

1. A method of processing visual media data (e.g., method 900 as shown in FIG. 9), comprising: performing 902 a conversion between visual media data and a visual media file that includes one or more tracks that store one or more bitstreams of the visual media data according to a format rule; wherein the format rule specifies whether to include, in a configuration record of a track, a first element indicative of a picture width of the track and/or a second element indicative of a picture height of the track is based on (1) whether a third element indicative of whether the track contains a specific bitstream corresponding to a specific output layer set and/or (2) whether the configuration record is for a single-layer bitstream, and wherein the format rule further specifies that the first element and/or the second element, when included in the configuration record of the track, are represented in a field including 16 bits.

2. The method of solution 1, wherein the format rule specifies to include the first element and/or the second element in response to the third element indicating that the track contains the specific bitstream corresponding to the specific output layer set.

3. The method of solution 1, wherein the format rule specifies to omit the first element and/or the second element in response to the third element indicating that the track is allowed not to contain the specific bitstream corresponding to the specific output layer set.

4. The method of solution 1, wherein the field includes 24 bits.

5. The method of solution 1, wherein the field includes 32 bits.

6. The method of solution 1, wherein the format rule specifies to omit the first element and/or the second element in response to the bitstream being the single-layer bitstream, cropping window offsets being all zero, and pictures being frames.

7. The method of solution 1, wherein the format rule further specifies a syntax constraint on a value of the first element and/or the second element based on whether a bitstream to which the configuration record applies is a single-layer bitstream.

8. The method of solution 7, wherein the format rule further specifies that, in response to the bitstream being the single-layer bitstream, the syntax constraint is that one or more picture width values indicated in one or more sequence parameter sets referenced by NAL (network abstraction layer) units included in samples of the visual media file to which a sample entry description of the configuration record applies are equal.

9. The method of solution 8, wherein the format rule further specifies that the value of the first element of the track storing the bitstream is equal to the one or more picture width values.

10. The method of solution 7, wherein the format rule further specifies that, in response to the bitstream being the single-layer bitstream, the syntax constraint is that one or more picture height values indicated in one or more sequence parameter sets referenced by NAL (network abstraction layer) units included in samples of the visual media file to which a sample entry description of the configuration record applies are equal.

11. The method of solution 10, wherein the format rule further specifies that the value of the second element of the track storing the bitstream is equal to the one or more picture height values.

12. The method of solution 7, wherein the format rule further specifies that, in response to the bitstream not being the single-layer bitstream, the syntax constraint is that the value of the first element is set to be equal to a maximum value of a picture width that is indicated in a video parameter set and applies to an output layer set identified by an output layer set index, among all picture width values indicated in all video parameter sets for all coded video sequences to which a sample entry description of the configuration record applies.

13. The method of solution 7, wherein the format rule further specifies that, in response to the bitstream not being the single-layer bitstream, the syntax constraint is that the value of the second element is set to be equal to a maximum value of picture height that is indicated in a video parameter set and applies to an output layer set identified by an output layer set index, among all picture height values indicated in all video parameter sets for all coded video sequences to which a sample entry description of the configuration record applies.

14. The method of any of solutions 1-13, wherein the conversion comprises generating the visual media file and storing the one or more bitstreams to the visual media file according to the format rule.

15. The method of any of solutions 1-13, wherein the conversion comprises parsing the visual media file according to the format rule to reconstruct the one or more bitstreams.

16. An apparatus of processing visual media data, comprising a processor configured to implement a method comprising: performing a conversion between visual media data and a visual media file that includes one or more tracks that store one or more bitstreams of the visual media data according to a format rule; wherein the format rule specifies whether to include, in a configuration record of a track, a first element indicative of a picture width of the track and/or a second element indicative of a picture height of the track is based on (1) whether a third element indicative of whether the track contains a specific bitstream corresponding to a specific output layer set and/or (2) whether the configuration record is for a single-layer bitstream, and wherein the format rule further specifies that the first element and/or the second element, when included in the configuration record of the track, are represented in a field including 16 bits.

17. The apparatus of solution 16, wherein the format rule specifies to include the first element and/or the second element in response to the third element indicating that the track contains the specific bitstream corresponding to the specific output layer set.

18. The apparatus of solution 16, wherein the format rule specifies to omit the first element and/or the second element in response to the third element indicating that the track is allowed not to contain the specific bitstream corresponding to the specific output layer set.

19. The apparatus of solution 16, wherein the format rule further specifies a syntax constraint on a value of the first element and/or the second element based on whether a bitstream to which the configuration record applies is a single-layer bitstream.

20. The apparatus of solution 19, wherein the format rule further specifies that, in response to the bitstream being the single-layer bitstream, the syntax constraint is that one or more picture width values indicated in one or more sequence parameter sets referenced by NAL (network abstraction layer) units included in samples of the visual media file to which a sample entry description of the configuration record applies are equal.

21. The apparatus of solution 19, wherein the format rule further specifies that, in response to the bitstream being the single-layer bitstream, the syntax constraint is that one or more picture height values indicated in one or more sequence parameter sets referenced by NAL (network abstraction layer) units included in samples of the visual media file to which a sample entry description of the configuration record applies are equal.

22. The apparatus of solution 19, wherein the format rule further specifies that, in response to the bitstream not being the single-layer bitstream, the syntax constraint is that the value of the first element is set to be equal to a maximum value of a picture width that is indicated in a video parameter set and applies to an output layer set identified by an output layer set index, among all picture width values indicated in all video parameter sets for all coded video sequences to which a sample entry description of the configuration record applies.

23. The apparatus of solution 19, wherein the format rule further specifies that, in response to the bitstream not being the single-layer bitstream, the syntax constraint is that the value of the second element is set to be equal to a maximum value of picture height that is indicated in a video parameter set and applies to an output layer set identified by an output layer set index, among all picture height values indicated in all video parameter sets for all coded video sequences to which a sample entry description of the configuration record applies.

24. A non-transitory computer-readable recording medium storing instructions that cause a processor to: perform a conversion between visual media data and a visual media file that includes one or more tracks that store one or more bitstreams of the visual media data according to a format rule; wherein the format rule specifies whether to include, in a configuration record of a track, a first element indicative of a picture width of the track and/or a second element indicative of a picture height of the track is based on (1) whether a third element indicative of whether the track contains a specific bitstream corresponding to a specific output layer set and/or (2) whether the configuration record is for a single-layer bitstream, and wherein the format rule further specifies that the first element and/or the second element, when included in the configuration record of the track, are represented in a field including 16 bits.

25. A non-transitory computer-readable recording medium storing a bitstream which is generated by a method performed by a video processing apparatus, wherein the method comprises: generating a visual media file that includes one or more tracks that store one or more bitstreams of visual media data according to a format rule; wherein the format rule specifies whether to include, in a configuration record of a track, a first element indicative of a picture width of the track and/or a second element indicative of a picture height of the track is based on (1) whether a third element indicative of whether the track contains a specific bitstream corresponding to a specific output layer set and/or (2) whether the configuration record is for a single-layer bitstream, and wherein the format rule further specifies that the first element and/or the second element, when included in the configuration record of the track, are represented in a field including 16 bits.

26. A video processing apparatus comprising a processor configured to implement a method recited in any one or more of solutions 1 to 15.

27. A method of storing visual media data to a file including one or more bitstreams, the method comprising a method recited in any one of solutions 1 to 15, and further including storing the one or more bitstream to a non-transitory computer-readable recording medium.

28. A computer readable medium storing program code that, when executed, causes a processor to implement a method recited in any one or more of solutions 1 to 15.

29. A computer readable medium that stores a bitstream generated according to any of the above described methods.

30. A video processing apparatus for storing a bitstream, wherein the video processing apparatus is configured to implement a method recited in any one or more of solutions 1 to 15.

31. A computer readable medium on which a bitstream complying to a file format that is generated according to any of solutions 1 to 15.

A fourth set of solutions provides example embodiments of techniques discussed in the previous section (e.g., item 7).

Figure 10:
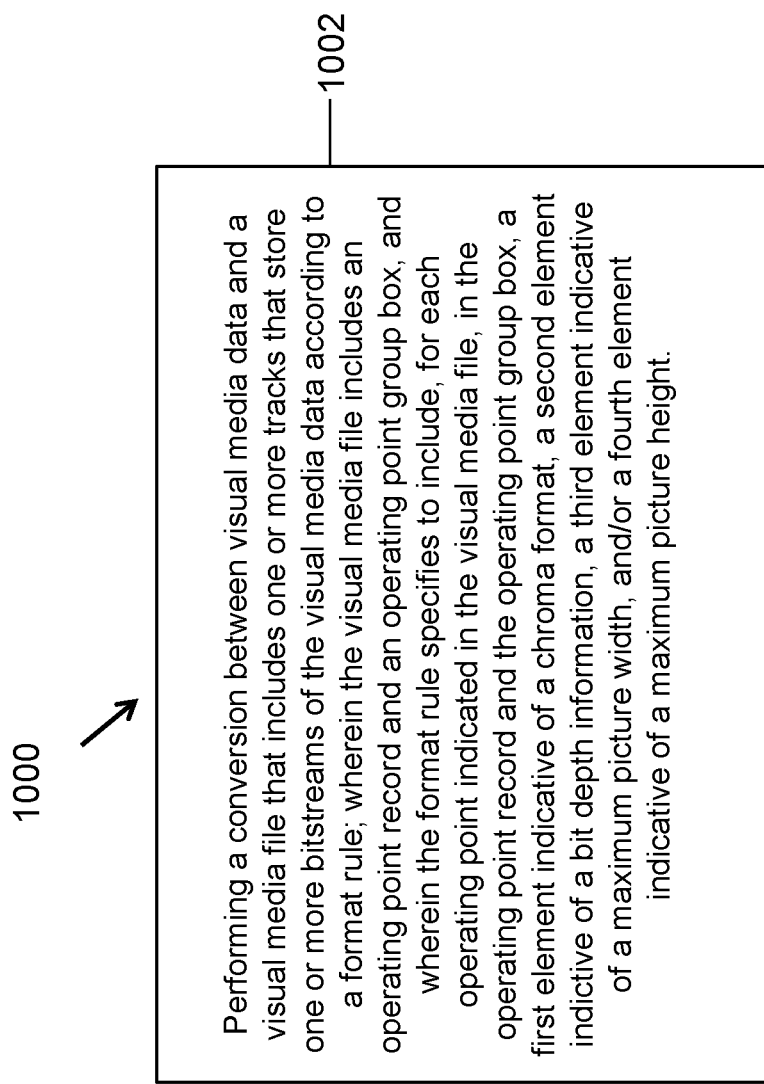

1. A method of processing visual media data (e.g., method 1000 as shown in FIG. 10), comprising: performing 1002 a conversion between visual media data and a visual media file that includes one or more tracks that store one or more bitstreams of the visual media data according to a format rule; wherein the visual media file includes an operating point record and an operating point group box, and wherein the format rule specifies to include, for each operating point indicated in the visual media file, in the operating point record and the operating point group box, a first element indicative of a chroma format, a second element indictive of a bit depth information, a third element indicative of a maximum picture width, and/or a fourth element indicative of a maximum picture height.

2. The method of solution 1, wherein the format rule further specifies that the first element, the second element, the third element, and/or the fourth element is immediately after a fifth element indicating a zero-based index of a profile, level, and tier structure for an output layer set identified by an output layer set index.

3. The method of solution 1, wherein the format rule further specifies a syntax constraint on a value of the first element, a value of the second element, a value of the third element, and/or a value of the fourth element that apply to an operating point associated with a bitstream based on whether the operating point contains only a single layer.

4. The method of solution 3, wherein the format rule further specifies that, in response to the operating point containing the single layer, the syntax constraint is that one or more chroma format values indicated in one or more sequence parameter sets referenced by NAL (network abstraction layer) units in the bitstream of the operating point are equal.

5. The method of solution 4, wherein the format rule further specifies that the value of the first element is equal to the one or more chroma format values.

6. The method of solution 3, wherein the format rule further specifies that, in response to the operating point containing more than one layer, the syntax constraint is that the value of the first element is set to be equal to a chroma format value that is indicated in a video parameter set and applies to an output layer set identified by an output layer set index.

7. The method of solution 3, wherein the format rule further specifies that, in response to the operating point containing the single layer, the syntax constraint is that one or more bit depth information values indicated in one or more sequence parameter sets referenced by NAL (network abstraction layer) units in the bitstream of the operating point are equal.

8. The method of solution 7, wherein the format rule further specifies that the value of the second element is equal to the one or more bit depth information values.

9. The method of solution 3, wherein the format rule further specifies that, in response to the operating point containing more than one layer, the syntax constraint is that the value of the second element is set to be equal to a bit depth information value that is indicated in a video parameter set and applies to an output layer set identified by an output layer set index.

10. The method of solution 3, wherein the format rule further specifies that, in response to the operating point containing the single layer, the syntax constraint is that one or more picture width values indicated in one or more sequence parameter sets referenced by NAL (network abstraction layer) units in the bitstream of the operating point are equal.

11. The method of solution 10, wherein the format rule further specifies that the value of the third element is equal to the one or more picture width values.

12. The method of solution 3, wherein the format rule further specifies that, in response to the operating point containing more than one layer, the syntax constraint is that the value of the third element is set to be equal to a picture width value that is indicated in a video parameter set and applies to an output layer set identified by an output layer set index.

13. The method of solution 3, wherein the format rule further specifies that, in response to the operating point containing the single layer, the syntax constraint is that one or more picture height values indicated in one or more sequence parameter sets referenced by NAL (network abstraction layer) units in the bitstream of the operating point are equal.

14. The method of solution 13, wherein the format rule further specifies that the value of the fourth element is equal to the one or more picture height values.

15. The method of solution 3, wherein the format rule further specifies that, in response to the operating point containing more than one layer, the syntax constraint is that the value of the fourth element is set to be equal to a picture height value that is indicated in a video parameter set and applies to an output layer set identified by an output layer set index.

16. The method of any one of solutions 1-15, wherein the conversion comprises generating a visual media file and storing the one or more bitstreams to the visual media file according to the format rule.

17. The method of any one of solutions 1-15, wherein the conversion comprises parsing the visual media file according to the format rule to reconstruct the one or more bitstreams.

18. An apparatus of processing visual media data, comprising a processor configured to implement a method comprising: performing a conversion between visual media data and a visual media file that includes one or more tracks that store one or more bitstreams of the visual media data according to a format rule; wherein the visual media file includes an operating point record and an operating point group box, and wherein the format rule specifies whether to include, for each operating point indicated in the visual media file, in the operating point record and the operating point group box, a first element indicative of a chroma format, a second element indictive of a bit depth information, a third element indicative of a maximum picture width, and/or a fourth element indicative of a maximum picture height.

19. The apparatus of solution 18, wherein the format rule further specifies that the first element, the second element, the third element, and/or the fourth element are immediately after a fifth element indicating a zero-based index of a profile, level, and tier structure for an output layer set identified by an output layer set index.

20. The apparatus of solution 18, wherein the format rule further specifies a syntax constraint on a value of the first element, a value of the second element, a value of the third element, and/or a value of the fourth element that apply to an operating point associated with a bitstream based on whether the operating point contains only a single-layer.

21. A non-transitory computer-readable recording medium storing instructions that cause a processor to: perform a conversion between visual media data and a visual media file that includes one or more tracks that store one or more bitstreams of the visual media data according to a format rule; wherein the visual media file includes an operating point record and an operating point group box, and wherein the format rule specifies whether to include, for each operating point indicated in the visual media file, in the operating point record and the operating point group box, a first element indicative of a chroma format, a second element indictive of a bit depth information, a third element indicative of a maximum picture width, and/or a fourth element indicative of a maximum picture height.

22. A non-transitory computer-readable recording medium storing a bitstream which is generated by a method performed by a video processing apparatus, wherein the method comprises: generating a visual media file that includes one or more tracks that store one or more bitstreams of the visual media data according to a format rule; wherein the visual media file includes an operating point record and an operating point group box, and wherein the format rule specifies whether to include, for each operating point indicated in the visual media file, in the operating point record and the operating point group box, a first element indicative of a chroma format, a second element indictive of a bit depth information, a third element indicative of a maximum picture width, and/or a fourth element indicative of a maximum picture height.

26. A video processing apparatus comprising a processor configured to implement a method recited in any one or more of solutions 1 to 17.

27. A method of storing visual media data to a file including one or more bitstreams, the method comprising a method recited in any one of solutions 1 to 17, and further including storing the one or more bitstream to a non-transitory computer-readable recording medium.

28. A computer readable medium storing program code that, when executed, causes a processor to implement a method recited in any one or more of solutions 1 to 17.

29. A computer readable medium that stores a bitstream generated according to any of the above described methods.

30. A video processing apparatus for storing a bitstream, wherein the video processing apparatus is configured to implement a method recited in any one or more of solutions 1 to 17.

31. A computer readable medium on which a bitstream complying to a file format that is generated according to any of solutions 1 to 17.

In the example solutions, the visual media data corresponds to video or images. In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:

1. A method of processing visual media data, comprising:
    performing a conversion between visual media data and a visual media file that includes one or more tracks that store one or more bitstreams of the visual media data according to a format rule;
    wherein the format rule that specifies whether to include, in a configuration record of a track, a first element indicative of a picture width of the track and/or a second element indicative of a picture height of the track is based on (1) whether a third element indicative of whether the track contains a specific bitstream corresponding to a specific output layer set and/or (2) whether the configuration record is for a single-layer bitstream, and
    wherein the format rule further specifies that the first element and/or the second element, when included in the configuration record of the track, are represented in a field including 16 bits.

2. The method of claim 1, wherein the format rule specifies to include the first element and/or the second element in response to the third element indicating that the track contains the specific bitstream corresponding to the specific output layer set.

3. The method of claim 1, wherein the format rule specifies to omit the first element and/or the second element in response to the third element indicating that the track is allowed not to contain the specific bitstream corresponding to the specific output layer set.

4. The method of claim 1, wherein the field includes 24 bits.

5. The method of claim 1, wherein the field includes 32 bits.

6. The method of claim 1, wherein the format rule specifies to omit the first element and/or the second element in response to the bitstream being the single-layer bitstream, cropping window offsets being all zero, and pictures being frames.

7. The method of claim 1,
    wherein the format rule further specifies a syntax constraint on a value of the first element and/or the second element based on whether a bitstream to which the configuration record applies is a single-layer bitstream.

8. The method of claim 7, wherein the format rule further specifies that, in response to the bitstream being the single-layer bitstream, the syntax constraint is that one or more picture width values indicated in one or more sequence parameter sets referenced by NAL (network abstraction layer) units included in samples of the visual media file to which a sample entry description of the configuration record applies are equal.

9. The method of claim 8, wherein the format rule further specifies that the value of the first element of the track storing the bitstream is equal to the one or more picture width values.

10. The method of claim 7, wherein the format rule further specifies that, in response to the bitstream being the single-layer bitstream, the syntax constraint is that one or more picture height values indicated in one or more sequence parameter sets referenced by NAL (network abstraction layer) units included in samples of the visual media file to which a sample entry description of the configuration record applies are equal.

11. The method of claim 10, wherein the format rule further specifies that the value of the second element of the track storing the bitstream is equal to the one or more picture height values.

12. The method of claim 7, wherein the format rule further specifies that, in response to the bitstream not being the single-layer bitstream, the syntax constraint is that the value of the first element is set to be equal to a maximum value of a picture width that is indicated in a video parameter set and applies to an output layer set identified by an output layer set index, among all picture width values indicated in all video parameter sets for all coded video sequences to which a sample entry description of the configuration record applies.

13. The method of claim 7, wherein the format rule further specifies that, in response to the bitstream not being the single-layer bitstream, the syntax constraint is that the value of the second element is set to be equal to a maximum value of picture height that is indicated in a video parameter set and applies to an output layer set identified by an output layer set index, among all picture height values indicated in all video parameter sets for all coded video sequences to which a sample entry description of the configuration record applies.

14. The method of claim 1, wherein the conversion comprises generating the visual media file and storing the one or more bitstreams to the visual media file according to the format rule.

15. The method of claim 1, wherein the conversion comprises parsing the visual media file according to the format rule to reconstruct the one or more bitstreams.

16. An apparatus of processing visual media data, comprising a processor configured to implement a method comprising:
    performing a conversion between visual media data and a visual media file that includes one or more tracks that store one or more bitstreams of the visual media data according to a format rule;
    wherein the format rule that specifies whether to include, in a configuration record of a track, a first element indicative of a picture width of the track and/or a second element indicative of a picture height of the track is based on (1) whether a third element indicative of whether the track contains a specific bitstream corresponding to a specific output layer set and/or (2) whether the configuration record is for a single-layer bitstream, and
    wherein the format rule further specifies that the first element and/or the second element, when included in the configuration record of the track, are represented in a field including 16 bits.

17. The apparatus of claim 16, wherein the format rule specifies to include the first element and/or the second element in response to the third element indicating that the track contains the specific bitstream corresponding to the specific output layer set.

18. The apparatus of claim 16, wherein the format rule specifies to omit the first element and/or the second element in response to the third element indicating that the track is allowed not to contain the specific bitstream corresponding to the specific output layer set.

19. The apparatus of claim 16, wherein the format rule further specifies a syntax constraint on a value of the first element and/or the second element based on whether a bitstream to which the configuration record applies is a single-layer bitstream.

20. A non-transitory computer-readable recording medium storing instructions that cause a processor to:
   perform a conversion between visual media data and a visual media file that includes one or more tracks that store one or more bitstreams of the visual media data according to a format rule;
   wherein the format rule that specifies whether to include, in a configuration record of a track, a first element indicative of a picture width of the track and/or a second element indicative of a picture height of the track is based on (1) whether a third element indicative of whether the track contains a specific bitstream corresponding to a specific output layer set and/or (2) whether the configuration record is for a single-layer bitstream, and
   wherein the format rule further specifies that the first element and/or the second element, when included in the configuration record of the track, are represented in a field including 16 bits.

* * * * *